(12) United States Patent
Deng et al.

(10) Patent No.: US 12,406,488 B2
(45) Date of Patent: Sep. 2, 2025

(54) NEURAL NETWORK MODEL TRAINING METHOD, IMAGE PROCESSING METHOD, AND APPARATUS

(71) Applicant: HUAWEI TECHNOLOGIES CO., LTD., Guangdong (CN)

(72) Inventors: Chuanyun Deng, Hangzhou (CN); Guanfu Chen, Hangzhou (CN); Shaohua Tang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 371 days.

(21) Appl. No.: 18/180,978

(22) Filed: Mar. 9, 2023

(65) Prior Publication Data

US 2023/0215159 A1    Jul. 6, 2023

Related U.S. Application Data

(63) Continuation of application No. PCT/CN2021/104015, filed on Jul. 1, 2021.

(30) Foreign Application Priority Data

Sep. 10, 2020 (CN) .......................... 202010948460.2

(51) Int. Cl.
*G06V 10/82* (2022.01)
*G06V 10/764* (2022.01)
(Continued)

(52) U.S. Cl.
CPC ............ *G06V 10/82* (2022.01); *G06V 10/764* (2022.01); *G06V 10/774* (2022.01); *G06V 10/776* (2022.01)

(58) Field of Classification Search
None
See application file for complete search history.

(56) References Cited

U.S. PATENT DOCUMENTS 9,792,492 B2 * 10/2017 Soldevila ............... G06V 40/10
2020/0012887 A1 * 1/2020 Li ......................... G06V 10/809
(Continued)

FOREIGN PATENT DOCUMENTS

CN    110135573 A    8/2019
CN    110457068 A    11/2019

OTHER PUBLICATIONS

Tuhin Sarkar:"6.883 Learning with Combinatorial Structure Notes for Lecture 13",Nov. 1, 2015, total 10 pages.

*Primary Examiner* — Leon Flores
(74) *Attorney, Agent, or Firm* — WOMBLE BOND DICKINSON (US) LLP

(57) ABSTRACT

This application discloses a neural network model training method, an image processing method, and an apparatus in the field of artificial intelligence. The method includes: inputting training data to a neural network model for feature extraction, and obtaining a first weight gradient of the neural network model based on an extracted feature; obtaining a candidate weight parameter, where a partial derivative of a function value of a target loss function to the candidate weight parameter is 0, the function value of the target loss function is determined based on a function value of a second loss function corresponding to a first prediction label, and the function value of the second loss function corresponding to the first prediction label indicates a difference between the candidate weight parameter and a weight parameter of the neural network model and a difference between a weight variation and the first weight gradient.

20 Claims, 11 Drawing Sheets

(51) Int. Cl.
 *G06V 10/774* (2022.01)
 *G06V 10/776* (2022.01)

(56) References Cited

U.S. PATENT DOCUMENTS

2020/0250491 A1* 8/2020 Peng .................... G06F 18/2148
2021/0390355 A1* 12/2021 Xu ........................ G06F 18/214
2022/0172378 A1* 6/2022 Sharma ................ G06V 10/764

* cited by examiner

NEURAL NETWORK MODEL TRAINING METHOD, IMAGE PROCESSING METHOD, AND APPARATUS

CROSS-REFERENCE TO RELATED APPLICATIONS

This application is a continuation of International Application No. PCT/CN2021/104015, filed on Jul. 1, 2021, which claims priority to Chinese Patent Application No. 202010948460.2, filed on Sep. 10, 2020. The disclosures of the aforementioned applications are hereby incorporated by reference in their entireties.

TECHNICAL FIELD

This application relates to the field of artificial intelligence, and more specifically, to a neural network model training method, an image processing method, and an apparatus.

BACKGROUND

Artificial intelligence (AI) is a theory, a method, a technology, or an application system that simulates, extends, and expands human intelligence by using a digital computer or a machine controlled by a digital computer, to sense the environment, obtain knowledge, and achieve an optimal result by using the knowledge. In other words, artificial intelligence is a branch of computer science, and is intended to understand the essence of intelligence and produce a new intelligent machine that can react in a manner similar to human intelligence. Artificial intelligence is to study design principles and implementation methods of various intelligent machines, so that the machines have perception, inference, and decision-making functions. Researches in the field of artificial intelligence include robotics, natural language processing, computer vision, decision-making and inference, human-computer interaction, recommendation and search, an AI basic theory, and the like.

With rapid development of artificial intelligence technologies, performance of a neural network (for example, a convolutional neural network) is continuously improved, and the neural network has made great achievements in processing and analyzing a plurality of media signals such as an image, a video, and a voice. To improve a training speed of the neural network and inference precision of a model, a batch normalization (BN) layer is usually added to the neural network model. The layer is added to a deep neural network, so that fluctuation in a training process of the deep neural network can be effectively reduced, and a convergence speed of training is accelerated. In addition, noise sensitivity of the deep neural network is avoided to some extent, so that robustness is higher.

However, an operation at the BN layer is mainly a non-matrix operation, and calculation complexity depends on an amount of input data (features). Usually, in a training process of the neural network model, the amount of input data (features) is greater than 100,000. As a result, the calculation complexity at the BN layer is very high, and processing efficiency is affected. Especially when a main calculation core of a current mainstream neural network processing chip is a matrix operation, the BN cannot effectively use a matrix operation capability in the existing chip, large overheads need to be occupied, and a training speed of the model is affected.

Therefore, how to improve training efficiency of the neural network model becomes an urgent technical problem to be resolved.

SUMMARY

This application provides a neural network model training method, an image processing method, and an apparatus, to accelerate a training process, and improve training efficiency of a neural network model.

According to a first aspect, a neural network model training method is provided. The method includes: obtaining training data; inputting the training data to a neural network model for feature extraction, and obtaining a first prediction label based on an extracted feature; determining, based on the first prediction label and a real label of the training data, a function value of a first loss function corresponding to the first prediction label, where the function value of the first loss function corresponding to the first prediction label indicates a difference between the first prediction label and the real label of the training data; calculating a first weight gradient of the neural network model based on the function value of the first loss function corresponding to the first prediction label; obtaining a candidate weight parameter, where a partial derivative of a function value of a target loss function to the candidate weight parameter is 0, the function value of the target loss function is determined based on a function value of a second loss function corresponding to the first prediction label, the function value of the second loss function corresponding to the first prediction label indicates a difference between the candidate weight parameter and a weight parameter of the neural network model and a difference between a weight variation and the first weight gradient, and the weight variation is a difference between the candidate weight parameter and the weight parameter of the neural network model; and updating the parameter of the neural network model based on the candidate weight parameter.

In the solution in an embodiment of the application, the difference between the candidate weight parameter and the weight parameter of the neural network model is controlled by using the second loss function, to control a parameter fluctuation range in a training process. This ensures controllability of gradient fluctuation, avoids training divergence and poor generalization caused by the gradient fluctuation, improves training stability, and accelerates the training process. In addition, the first loss function is used to continuously improve inference precision of the neural network model in the training process, and the second loss function can be in a convergence trend consistent with the first loss function. This ensures the inference precision of the neural network model. For example, the solution in an embodiment of the application may be used to optimize a training process of an original neural network model. The first loss function may be understood as an original loss function of the neural network model. The original loss function is used to enable the prediction label output by the trained neural network model to be the same as the real label of the training data as much as possible. According to the solution in an embodiment of the application, the training stability can be improved and the training process can be accelerated when it can be ensured that an original prediction task is implemented.

In addition, training overheads of the neural network model using the first loss function are almost the same as those of the neural network model using the target loss function. In other words, in comparison with the neural network model using the first loss function, the solution in an embodiment of the application can improve a training speed and inference precision of the neural network model without increasing the overheads. The solution in an embodiment of the application greatly reduces training resources and training costs. In addition, the same training resources can support training of more neural network models.

In addition, the solution in an embodiment of the application may be completed based on the existing neural network. In an embodiment, a new optimization target is set based on the existing neural network model, and the solution can be completed without user perception, in other words, without making any modification by a user. This improves user experience.

A type of the training data is related to a task of the neural network model. For example, if the neural network model is used for image processing, the training data may be an image.

A type of the label is related to a processing task of the neural network model. For example, if the neural network model is used for image classification, the label may be a classification label, and indicates a category of an image. The real label of the training data is a real category of the image. The prediction label may be a prediction category of the image or a prediction probability of the category of the image.

A type of the first loss function is related to a task of the neural network model. For example, if the neural network model is used for image processing, the first loss function may be a cross-entropy loss function. The type of the first loss function is not limited in an embodiment of the application.

For example, the updating the parameter of the neural network model based on the candidate weight parameter may include: using the candidate weight parameter as the updated weight parameter of the neural network model.

With reference to the first aspect, in an embodiment of the first aspect, the method further includes: obtaining an original neural network model; and deleting a BN layer from the original neural network model to obtain the neural network model.

With reference to the first aspect, in an embodiment of the first aspect, the method further includes: obtaining at least one second prediction label based on a feature output by at least one layer in the neural network model; determining, based on the at least one second prediction label and the real label of the training data, a function value of a first loss function corresponding to the at least one second prediction label, where the function value of the first loss function corresponding to the at least one second prediction label indicates a difference between the at least one second prediction label and the real label of the training data; and calculating at least one second weight gradient of the neural network model based on the function value of the first loss function corresponding to the at least one second prediction label, where the function value of the target loss function is determined based on the function value of the second loss function corresponding to the first prediction label and a function value of the second loss function corresponding to the at least one second prediction label, and the function value of the second loss function corresponding to the at least one second prediction label indicates a difference between the candidate weight parameter and the weight parameter of the neural network model and a difference between the weight variation and the second weight gradient.

According to the solution in an embodiment of the application, the second prediction label is obtained based on the feature output by the at least one layer in the neural network model, to calculate, based on the second prediction label, the second weight gradient as an auxiliary reference for updating the parameter of the neural network model, so that gradient fluctuation can be reduced, and training stability can be improved.

With reference to the first aspect, in an embodiment of the first aspect, the method further includes: obtaining at least one second prediction label based on a feature output by at least one downsampling layer in the neural network model; determining, based on the at least one second prediction label and the real label of the training data, a function value of a first loss function corresponding to the at least one second prediction label, where the function value of the first loss function corresponding to the at least one second prediction label indicates a difference between the at least one second prediction label and the real label of the training data; and calculating at least one second weight gradient of the neural network model based on the function value of the first loss function corresponding to the at least one second prediction label, where the function value of the target loss function is determined based on the function value of the second loss function corresponding to the first prediction label and a function value of the second loss function corresponding to the at least one second prediction label, and the function value of the second loss function corresponding to the at least one second prediction label indicates a difference between the candidate weight parameter and the weight parameter of the neural network model and a difference between the weight variation and the second weight gradient.

According to the solution in an embodiment of the application, the second prediction label is obtained based on the feature output by the downsampling layer, to calculate, based on the second prediction label, the second weight gradient as an auxiliary reference for updating the parameter of the neural network model, so that gradient fluctuation can be further reduced, and training stability can be improved.

In addition, only the second prediction label obtained based on the feature output by the downsampling layer is used for assisted training, a small calculation amount is added, and a large quantity of training resources are not occupied. That is, almost without increasing overheads, gradient fluctuation is further reduced, and training stability is improved.

The downsampling layer is a layer that enables a resolution of an output feature map to be less than a resolution of an input feature map. If the neural network model includes N downsampling layers, the neural network model includes N resolution downgrade positions.

M second prediction labels may be obtained based on a feature output by M downsampling layers of the N downsampling layers.

The obtaining M second prediction labels based on the feature output by M downsampling layers may be: respectively inputting the feature output by the M downsampling layers to M output layers, to obtain the M second prediction labels.

The M output layers have a same structure as an output layer of the neural network model. The structure of the output layer is related to a task of the neural network model. For example, when the neural network model is used for image classification, the output layer may also be referred to as a classification layer. For example, the classification layer may be a softmax layer, and the softmax layer may output a predicted classification label of an image.

For example, the function value of the target loss function may satisfy the following formula:

$$L_{all}=L_{new\_n}+L_{new}, \text{ where}$$

$L_{all}$ represents the function value of the target loss function, and $L_{new\_n}$ represents the function value of the second loss function corresponding to the second prediction label. If the second prediction label is obtained based on the feature output by the downsampling layer, $L_{new\_n}$ may also be understood as a function value of the second loss function corresponding to an $n^{th}$ downsampling layer.

With reference to the first aspect, in an embodiment of the first aspect, that the function value of the target loss function is determined based on the function value of the second loss function corresponding to the first prediction label and a function value of the second loss function corresponding to the at least one second prediction label includes: a weight that corresponds to the function value of the second loss function corresponding to the at least one second prediction label and that is in the function value of the target loss function is in a negative correlation with a quantity of update times of the neural network model.

According to the solution in an embodiment of the application, a proportion of the function value of the second loss function corresponding to the second prediction label to the function value of the target loss function decreases with the quantity of update times of the neural network model. In this way, stability of the neural network model in an initial training phase can be improved. In a later training phase, when the proportion of the second loss function corresponding to the second prediction label decreases to 0, the neural network model completes training based on only the second loss function corresponding to the first prediction label. This further reduces a calculation amount, and reduces training overheads.

For example, the function value Lan of the target loss function may satisfy the following formula:

$$L_{all}=a_n*L_{new\_n}+L_{new}, \text{ where}$$

$a_n$ represents a weight corresponding to $L_{new\_n}$, and $a_n$ is in a negative correlation with the quantity of update times of the neural network model.

With reference to the first aspect, in an embodiment of the first aspect, the neural network model includes a first feature normalization layer, and the first feature normalization layer is located before an output layer of the neural network model, and is used to perform feature normalization processing on a feature input to the first feature normalization layer.

In the solution in an embodiment of the application, by performing feature normalization processing, forward fluctuation is controlled within a range, so that the entire training process is more stable, and the training process can be further accelerated.

For example, the first FN layer performs feature normalization processing on the feature input to the first FN layer, and inputs a processing result to the output layer of the neural network model, and the output layer outputs the first prediction label.

For example, feature normalization processing may be: dividing an input feature by a square root of all the input features. For example, the result of the feature normalization processing may satisfy the following formula:

$$\hat{x}_i = \frac{x_i}{\sqrt{\sum_{i=1}^{m} x_i^2}},$$

where $x_i$ represents an $i^{th}$ input feature, m represents a quantity of input features, and $\hat{x}_i$ represents a result obtained by performing feature normalization on the $i^{th}$ input feature.

With reference to the first aspect, in an embodiment of the first aspect, the neural network model includes at least one second feature normalization layer, and the at least one second feature normalization layer is respectively located after the at least one downsampling layer, and is used to perform feature normalization processing on a feature input to the at least one second feature normalization layer; and the obtaining at least one second prediction label based on a feature output by at least one downsampling layer in the neural network model includes: respectively inputting the feature output by the at least one downsampling layer in the neural network model to the at least one second feature normalization layer for feature normalization processing, and obtaining the at least one second prediction label based on a processing result.

In the solution in an embodiment of the application, by performing feature normalization processing, forward fluctuation is controlled within a range, so that the entire training process is more stable, and the training process can be further accelerated. Especially, compared with a neural network model using a BN module or the like, the neural network model using the BN module or the like usually needs a large quantity of BN modules, which occupies a large quantity of training overheads. The solution in an embodiment of the application can achieve a same convergence speed and inference precision as the neural network model using the BN module or the like. In addition, in the solution in an embodiment of the application, the FN layers are disposed only before the downsampling layer and a last output layer of the neural network model, a small quantity of FN layers are needed, and training overheads are far less than training overheads needed by the neural network model using the BN module or the like.

With reference to the first aspect, in an embodiment of the first aspect, the function value of the second loss function corresponding to the first prediction label indicates a sum of the difference between the candidate weight parameter and the weight parameter of the neural network model and the difference between the weight variation and the first weight gradient.

With reference to the first aspect, in an embodiment of the first aspect, the second loss function satisfies the following formula:

$$L_{new}=\lambda_1*d_1(w-w_k,\nabla_w^L)+\lambda_2*d_2(w,w_k), \text{ where}$$

$L_{new}$ represents the second loss function, w represents the candidate weight parameter, and $w_k$ represents the weight parameter of the neural network model; and $\nabla_w^L$ represents a weight gradient of the neural network model, $d_1$ represents a function indicating a difference between the weight variation and the weight gradient, $d_2$ represents a function indicating the difference between the candidate weight parameter and the weight parameter of the neural network model, $\lambda_1$ represents a weight of $d_1$, and $\lambda_2$ represents a weight of $d_2$.

That is, the candidate weight parameter w may satisfy the following formula:

$$w = \mathrm{argmin}_w L_{new} = \mathrm{argmin}_w \lambda_1 * d_1(w - w_k, \nabla_w^L) + \lambda_2 * d_2(w, w_k).$$

For example, $d_1$ may be a distance measurement function. In other words, the difference between the weight variation $w - w_k$ and $\nabla_w^L$ is represented by using a distance between the weight variation $w - w_k$ and $\nabla_w^L$. For another example, $d_1$ may be a cosine similarity function. $d_2$ may be a distance measurement function. In other words, the difference between w and $w_k$ is represented by using a distance between w and $w_k$. For another example, $d_2$ may be a cosine similarity function.

For example, the candidate weight parameter may be obtained by making the partial derivative of $L_{new}$ to w be 0. The candidate weight parameter is a weight parameter that minimizes the function value of $L_{new}$.

With reference to the first aspect, in an embodiment of the first aspect, the updating the parameter of the neural network model based on the candidate weight parameter includes: updating the parameter of the neural network model based on the candidate weight parameter and a learning rate, where the learning rate indicates a change amplitude of the weight parameter of the neural network model.

In an embodiment of the application, by setting the learning rate, a process of updating the parameter can be smoothed, to further control a parameter fluctuation range, further improve training stability, accelerate a convergence process, and improve training efficiency.

With reference to the first aspect, in an embodiment of the first aspect, the updated weight parameter of the neural network model satisfies the following formula:

$$w_{k+1} = (w - w_k) * lr + w_k, \text{ where}$$

$w_{k+1}$ represents the updated weight parameter of the neural network model, $w_k$ represents the weight parameter of the neural network model, w represents the candidate weight parameter, and lr represents the learning rate.

According to a second aspect, an image processing method is provided. The method includes: obtaining a to-be-processed image; and performing feature extraction on the to-be-processed image by using a target neural network model, and obtaining a processing result of the to-be-processed image based on a feature extracted by the target neural network model, where the target neural network model performs feature extraction by inputting training data to the neural network model; obtains a first prediction label based on the feature extracted by the neural network model; determines, based on the first prediction label and a real label of the training data, a function value of a first loss function corresponding to the first prediction label, where the function value of the first loss function corresponding to the first prediction label indicates a difference between the first prediction label and the real label of the training data; calculates a first weight gradient of the neural network model based on the function value of the first loss function corresponding to the first prediction label; obtains a candidate weight parameter, where a partial derivative of a function value of a target loss function to the candidate weight parameter is 0; and updates a parameter of the neural network model based on the candidate weight parameter, where the function value of the target loss function is determined based on a function value of a second loss function corresponding to the first prediction label, the function value of the second loss function corresponding to the first prediction label indicates a difference between the candidate weight parameter and a weight parameter of the neural network model and a difference between a weight variation and the first weight gradient, and the weight variation is a difference between the candidate weight parameter and the weight parameter of the neural network model.

The target neural network model may be obtained by using the neural network model update method in the first aspect. The target neural network model may be a trained neural network model, and to-be-processed images may be classified by using the trained neural network model.

In this application, because the target neural network model is obtained by using the method in the first aspect, and relatively meets or approaches an application requirement of the neural network model. For image classification, the neural network model can achieve a good image classification effect (for example, a more accurate classification result).

In a training process, a parameter fluctuation range in the training process is controlled by using a value of the weight variation of the second loss function, to ensure controllability of gradient fluctuation, avoid training divergence and poor generalization caused by the gradient fluctuation, improve training stability, and accelerate the training process. In addition, the first loss function is used to continuously improve inference precision of the neural network model in the training process, and the second loss function can be in a convergence trend consistent with the first loss function. This ensures the inference precision of the neural network model. For example, the solution in an embodiment of the application may be used to optimize a training process of an original neural network model. The first loss function may be understood as an original loss function of the neural network model. The original loss function is used to enable the prediction label output by the trained neural network model to be the same as the real label of the training data as much as possible. According to the solution in an embodiment of the application, the training stability can be improved and the training process can be accelerated when it can be ensured that an original prediction task is implemented.

With reference to the second aspect, in an embodiment of the second aspect, the function value of the target loss function is determined based on the function value of the second loss function corresponding to the first prediction label and a function value of the second loss function corresponding to at least one second prediction label, the function value of the second loss function corresponding to the at least one second prediction label indicates a difference between the candidate weight parameter and the weight parameter of the neural network model and a difference between the weight variation and a second weight gradient, the at least one second prediction label is obtained based on feature output by at least one layer in the neural network model, the function value of the second loss function corresponding to the at least one second prediction label is determined based on the at least one second prediction label and the real label of the training data, a function value of the first loss function corresponding to the at least one second prediction label indicates a difference between the at least one second prediction label and the real label of the training data, and the at least one second weight gradient is obtained through calculation based on the function value of the first loss function corresponding to the at least one second prediction label.

With reference to the second aspect, in an embodiment of the second aspect, the function value of the target loss function is determined based on the function value of the second loss function corresponding to the first prediction label and a function value of the second loss function corresponding to at least one second prediction label, the function value of the second loss function corresponding to the at least one second prediction label indicates a difference between the candidate weight parameter and the weight parameter of the neural network model and a difference between the weight variation and a second weight gradient, the at least one second prediction label is obtained based on a feature output by at least one downsampling layer in the neural network model, the function value of the second loss function corresponding to the at least one second prediction label is determined based on the at least one second prediction label and the real label of the training data, a function value of the first loss function corresponding to the at least one second prediction label indicates a difference between the at least one second prediction label and the real label of the training data, and the at least one second weight gradient is obtained through calculation based on the function value of the first loss function corresponding to the at least one second prediction label.

With reference to the second aspect, in an embodiment of the second aspect, that the function value of the target loss function is determined based on the function value of the second loss function corresponding to the first prediction label and a function value of the second loss function corresponding to the at least one second prediction label includes: a weight that corresponds to the function value of the second loss function corresponding to the at least one second prediction label and that is in the function value of the target loss function is in a negative correlation with a quantity of update times of the neural network model.

With reference to the second aspect, in an embodiment of the second aspect, the target neural network model includes a first feature normalization layer, and the first feature normalization layer is located before an output layer of the target neural network model, and is used to perform feature normalization processing on a feature input to the first feature normalization layer.

With reference to the second aspect, in an embodiment of the second aspect, the neural network model includes at least one second feature normalization layer, the at least one second feature normalization layer is respectively located after the at least one downsampling layer, and is used to perform feature normalization processing on a feature input to the at least one second feature normalization layer, a feature output by the at least one downsampling layer in the neural network model is respectively input to the at least one second feature normalization layer for feature normalization processing, and the at least one second prediction label is obtained based on a processing result.

With reference to the second aspect, in an embodiment of the second aspect, the function value of the second loss function corresponding to the first prediction label indicates a sum of the difference between the candidate weight parameter and the weight parameter of the neural network model and the difference between the weight variation and the first weight gradient.

With reference to the second aspect, in an embodiment of the second aspect, the second loss function satisfies the following formula:

$$L_{new} = \lambda_1 * d_1(w - w_k, \nabla_w^L) + \lambda_2 * d_2(w, w_k), \text{ where}$$

$L_{new}$ represents the second loss function, w represents the candidate weight parameter, and $w_k$ represents the weight parameter of the neural network model; and $\nabla_w^L$ represents a weight gradient of the neural network model, $d_1$ represents a function indicating a difference between the weight variation and the weight gradient, $d_2$ represents a function indicating the difference between the candidate weight parameter and the weight parameter of the neural network model, $\lambda_1$ represents a weight of $d_1$, and $\lambda_2$ represents a weight of $d_2$.

With reference to the second aspect, in an embodiment of the second aspect, the updating the parameter of the neural network model based on the candidate weight parameter includes: updating the parameter of the neural network model based on the candidate weight parameter and a learning rate, where the learning rate indicates a change amplitude of the weight parameter of the neural network model.

With reference to the second aspect, in an embodiment of the second aspect, the updated weight parameter of the neural network model satisfies the following formula:

$$w_{k+1} = (w - w_k) * lr + w_k, \text{ where}$$

$w_{k+1}$ represents the updated weight parameter of the neural network model, $w_k$ represents the weight parameter of the neural network model, w represents the candidate weight parameter, and lr represents the learning rate.

According to a third aspect, a neural network model training apparatus is provided. The apparatus includes a module or unit configured to perform the method in any one of the first aspect and the implementations of the first aspect.

According to a fourth aspect, an image processing apparatus is provided. The apparatus includes a module or unit configured to perform the method in any one of the second aspect and the implementations of the second aspect.

It should be understood that extensions to, limitations on, explanations for, and descriptions of corresponding content in the first aspect are also applicable to same content in the second aspect, the third aspect, and the fourth aspect.

According to a fifth aspect, a neural network model training apparatus is provided. The apparatus includes: a memory, configured to store a program; and a processor, configured to execute the program stored in the memory, where when the program stored in the memory is executed, the processor is configured to perform the method in any one of the first aspect and the implementations of the first aspect.

The processor in the fifth aspect may be a central processing unit (CPU), or may be a combination of a CPU and a neural network operation processor. The neural network operation processor herein may include a graphics processing unit (GPU), a neural-network processing unit (NPU), a tensor processing unit (TPU), and the like. The TPU is an artificial intelligence accelerator-specific integrated circuit customized by Google for machine learning.

According to a sixth aspect, an image processing apparatus is provided. The apparatus includes: a memory, configured to store a program; and a processor, configured to execute the program stored in the memory, where when the program stored in the memory is executed, the processor is configured to perform the method in any one of the second aspect and the implementations of the second aspect.

The processor in the sixth aspect may be a central processing unit, or may be a combination of a CPU and a neural network operation processor. The neural network operation processor herein may include a graphics processing unit, a neural-network processing unit, a tensor processing unit, and the like. The TPU is an artificial intelligence accelerator-specific integrated circuit customized by Google for machine learning.

According to a seventh aspect, a computer-readable medium is provided. The computer-readable medium stores program code to be executed by a device, and the program code is used to perform the method in any one of the implementations of the first aspect or the second aspect.

According to an eighth aspect, a computer program product including instructions is provided. When the computer program product runs on a computer, the computer is enabled to perform the method in any one of the implementations of the first aspect or the second aspect.

According to a ninth aspect, a chip is provided. The chip includes a processor and a data interface. The processor reads, through the data interface, instructions stored in a memory, to perform the method in any one of the implementations of the first aspect or the second aspect.

For example, in an embodiment, the chip may further include the memory, and the memory stores the instructions. The processor is configured to execute the instructions stored in the memory, and when the instructions are executed, the processor is configured to perform the method in any one of the implementations of the first aspect or the second aspect.

The foregoing chip may be a field-programmable gate array (FPGA) or an application-specific integrated circuit (ASIC).

DESCRIPTION OF EMBODIMENTS

The following describes technical solutions in embodiments of this application with reference to the accompanying drawings in embodiments of this application.

Figure 1:
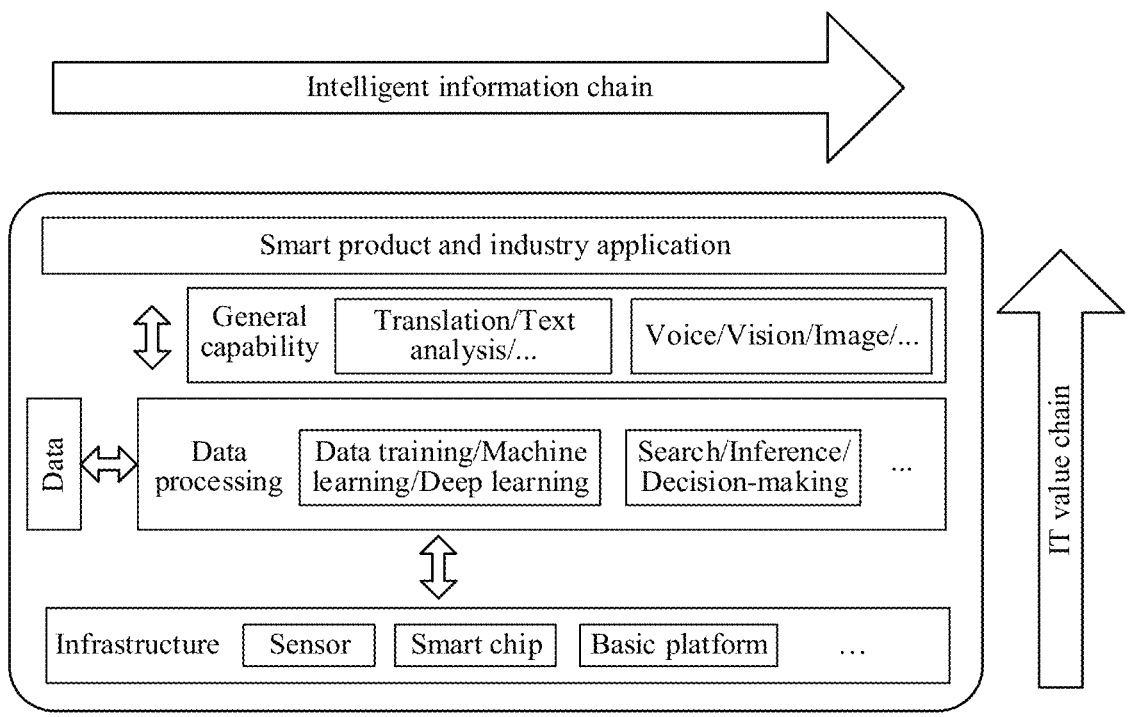
FIG. 1 is a schematic diagram of an artificial intelligence main framework according to an embodiment of this application.

FIG. 1 is a schematic diagram of an artificial intelligence main framework. The main framework describes an overall working procedure of an artificial intelligence system, and is applicable to a requirement of a general artificial intelligence field.

The following describes in detail the foregoing artificial intelligence main framework from two dimensions: an "intelligent information chain" (horizontal axis) and an "information technology (IT) value chain" (vertical axis).

The "intelligent information chain" reflects a series of processes from obtaining data to processing the data. For example, the process may be a general process of intelligent information perception, intelligent information representation and formation, intelligent inference, intelligent decision-making, and intelligent execution and output. In this process, the data undergoes a refinement process of "data-information-knowledge-intelligence".

The "IT value chain", from an underlying infrastructure and information (technology providing and processing implementation) of artificial intelligence to an industrial ecological process of a system, reflects a value that artificial intelligence contributes to the information technology industry.

(1) Infrastructure

The infrastructure provides calculation capability support for the artificial intelligence system, implements communication with the external world, and implements support by using a basic platform.

The infrastructure can communicate with the outside by using a sensor, and a calculation capability of the infrastructure can be provided by a smart chip.

The smart chip herein may be a hardware acceleration chip such as a central processing unit (CPU), a neural-network processing unit (NPU), a graphics processing unit (GPU), an application-specific integrated circuit (ASIC), or a field-programmable gate array (FPGA).

The basic platform of the infrastructure may include related platforms, for example, a distributed computing framework and a network, for assurance and support, including cloud storage and calculation, an interconnection network, and the like.

For example, the infrastructure can communicate with the outside by using the sensor, to obtain data, and the data is provided to a smart chip in a distributed computing system provided by the basic platform for calculation.

(2) Data

Data at an upper layer of the infrastructure indicates a data source in the field of artificial intelligence. The data relates to a graph, an image, voice, and text, further relates to Internet of things data of a conventional device, and includes service data of an existing system and perception data such as force, displacement, a liquid level, a temperature, and humidity.

(3) Data Processing

The data processing usually includes a processing manner such as data training, machine learning, deep learning, searching, inference, or decision-making.

Machine learning and deep learning may mean performing symbolic and formalized intelligent information modeling, extraction, preprocessing, training, and the like on data.

Inference is a process in which a human intelligent inference manner is simulated in a computer or an intelligent system, and machine thinking and problem resolving are performed by using formal information according to an inference control policy. A typical function is searching and matching.

Decision-making is a process in which a decision is made after intelligent information is inferred, and usually provides functions such as classification, ranking, and prediction.

(4) General Capability

After data processing mentioned above is performed on data, some general capabilities may further be formed based on a data processing result, for example, an algorithm or a general system, such as translation, text analysis, computer vision processing, speech recognition, and image recognition.

(5) Smart Product and Industry Application

The smart product and the industry application are a product and an application of the artificial intelligence system in various fields, and are package of an overall solution of the artificial intelligence, so that decision-making for intelligent information is productized and an application is implemented. Application fields mainly include: smart manufacturing, smart transportation, smart home, smart health care, smart security protection, autonomous driving, a safe city, a smart terminal, and the like.

Embodiments of this application may be applied to many fields of artificial intelligence, for example, fields such as smart manufacturing, smart transportation, smart home, smart health care, smart security protection, autonomous driving, and a smart city.

For example, embodiments of this application may be applied to fields in which a (deep) neural network needs to be used, for example, autonomous driving, image classification, image retrieval, image semantic segmentation, image quality enhancement, image super-resolution processing, and natural language processing.

The following briefly describes two application scenarios of album image classification and the smart city.

Album Image Classification:

When a user stores a large quantity of images on a terminal device (for example, a mobile phone) or a cloud disk, recognition of images in an album may help the user or a system perform classification management on the album. This improves user experience.

According to a neural network model training method in embodiments of this application, a neural network applicable to album classification can be obtained or optimized. Then, the neural network may classify images, to label images of different categories. This facilitates viewing and searching by the user. In addition, classification labels of the images may also be provided for an album management system for classification management. This saves management time of the user, improves album management efficiency, and improves user experience.

Attribute Identification in a Smart City Scenario:

In the smart city scenario, a plurality of types of attribute recognition need to be performed, for example, pedestrian attribute recognition and riding attribute recognition. The deep neural network plays an important role in the plurality of types of attribute recognition by using a powerful capability of the deep neural network. According to the neural network model training method in embodiments of this application, a neural network applicable to the attribute recognition in the smart city scenario can be obtained or optimized. Then, an input road image may be processed by using the neural network, to recognize different attribute information in the road image.

Because embodiments of this application relate to massive application of a neural network, for ease of understanding, the following describes terms and concepts related to the neural network that may be used in embodiments of this application.

(1) Neural Network

The neural network may include a neuron. The neuron may be an operation unit that uses $x_s$ and an intercept of 1 as input. Output of the operation unit may be as follows:

$$h_{W,b}(x)=f(W^T x)=f(\Sigma_{s=1}^n W_s x_s + b) \quad (1\text{-}1)$$

s=1, 2, . . . , or n, n is a natural number greater than 1, $W_s$ is a weight of $x_s$, and b is a bias of the neuron. f is an activation function of the neuron, used to introduce a non-linear feature into the neural network, to convert an input signal in the neuron into an output signal. The output signal of the activation function may be used as an input of a next convolutional layer, and the activation function may be a sigmoid function. The neural network is a network constituted by connecting a plurality of single neurons together. For example, an output of a neuron may be an input to another neuron. An input of each neuron may be connected to a local receptive field of a previous layer to extract a feature of the local receptive field. The local receptive field may be a region including several neurons.

(2) Deep Neural Network

The deep neural network (DNN) is also referred to as a multi-layer neural network, and may be understood to be a neural network with a plurality of hidden layers. The DNN is divided based on positions of different layers, and a neural network in the DNN may be divided into three types: an input layer, a hidden layer, and an output layer. Usually, a first layer is the input layer, a last layer is the output layer, and a middle layer is the hidden layer. Layers are fully connected. For example, any neuron at an $i^{th}$ layer is necessarily connected to any neuron at an $(i+1)^{th}$ layer.

Although the DNN seems complex, the DNN is actually not complex in terms of work at each layer, and is simply represented as the following linear relationship expression: $\vec{y}=\alpha(W\vec{x}+\vec{b})$, where $\vec{x}$ is an input vector, $\vec{y}$ is an output vector, $\vec{b}$ is a bias vector, W is a weight matrix (which is also referred to as a coefficient), and $\alpha(\ )$ is an activation function. At each layer, the output vector $\vec{y}$ is obtained by performing such a simple operation on the input vector $\vec{x}$. Because there are a plurality of layers in the DNN, there are also a plurality of coefficients W and a plurality of bias vectors $\vec{b}$. Definitions of the parameters in the DNN are as follows: The coefficient W is used as an example. It is assumed that in a DNN with three layers, a linear coefficient from a fourth neuron at a second layer to a second neuron at a third layer is defined as $W_{24}^3$. The superscript 3 indicates a layer at which the coefficient W is located, and the subscript corresponds to an output third-layer index 2 and an input second-layer index 4.

In conclusion, a coefficient from a $k^{th}$ neuron at an $(L-1)^{th}$ layer to a $j^{th}$ neuron at an $L^{th}$ layer is defined as $W_{jk}^L$.

It should be noted that there is no parameter W at the input layer. In the deep neural network, more hidden layers make the network more capable of describing a complex case in the real world. Theoretically, a model with more parameters indicates higher complexity and a larger "capacity", and indicates that the model can be used to complete a more complex learning task. A process of training the deep neural network is a process of learning a weight matrix, and a final target of training is to obtain weight matrices of all layers of a trained deep neural network (weight matrices formed by vectors W at many layers).

(3) Convolutional Neural Network

The convolutional neural network (CNN) is a deep neural network with a convolutional architecture. The convolutional neural network includes a feature extractor including a convolutional layer and a sub-sampling layer, and the feature extractor may be considered as a filter. The convolutional layer is a neuron layer that is in the convolutional neural network and at which convolution processing is performed on an input signal. At the convolutional layer of the convolutional neural network, one neuron may be connected only to some neurons at a neighboring layer. One convolutional layer usually includes several feature planes, and each feature plane may include some neurons arranged in a rectangular form. Neurons on a same feature plane share a weight, where the shared weight is a convolution kernel. Weight sharing may be understood as that an image information extraction manner is irrelevant to a position. The convolution kernel may be initialized in a form of a matrix of a random size. In a training process of the convolutional neural network, the convolution kernel may obtain an appropriate weight through learning. In addition, a direct benefit brought by weight sharing is to reduce connections between layers of the convolutional neural network while reducing an overfitting risk.

(4) Residual Network

A residual network (ResNet) is a convolutional neural network structure, and the network structure is formed by cascading a plurality of residual units, where the residual unit is the most important feature of the residual network.

For brevity, the residual network may be as follows: In addition to a plurality of hidden layers in the deep neural network that are connected layer by layer, for example, a first-layer hidden layer is connected to a second-layer hidden layer, the second-layer hidden layer is connected to a third-layer hidden layer, and the third-layer hidden layer is connected to a fourth-layer hidden layer (this is a data operation path of the neural network, and may also be referred to as neural network transmission), the residual network further includes a direct branch. The direct branch is directly connected to the first-layer hidden layer and the fourth-layer hidden layer, in other words, skips processing of the second-layer hidden layer and that of the third-layer hidden layer, and directly transmits data of the first-layer hidden layer to the fourth-layer hidden layer for operation. That is, a residual unit is formed.

Based on a gradient direct conduction characteristic of the residual unit, the ResNet network, for example, a typical ResNet50 and ResNet101, may reach a structure depth of hundreds of layers or even thousands of layers.

(5) Loss Function

In a process of training the deep neural network, because it is expected that an output of the deep neural network is as close as possible to a value that actually needs to be predicted, a current predicted value of the network and an actually expected target value may be compared, and then a weight vector of each layer of the neural network is updated based on a difference between the current predicted value and the target value (certainly, there is usually an initialization process before the first update time, for example, parameters are preconfigured for all layers of the deep neural network). For example, if the predicted value of the network is large, the weight vector is adjusted to decrease the predicted value, and adjustment is continuously performed, until the deep neural network can predict the actually expected target value or a value that is very close to the actually expected target value. Therefore, "how to obtain, through comparison, a difference between the predicted value and the target value" needs to be predefined. This is a loss function or an objective function. The loss function and the objective function are important equations used to measure the difference between the predicted value and the target value. The loss function is used as an example. A higher output value (loss) of the loss function indicates a larger difference. Therefore, training of the deep neural network is a process of minimizing the loss as much as possible. Usually, a smaller loss indicates better training quality of the deep neural network, and a larger loss indicates poorer training quality of the deep neural network. Similarly, smaller loss fluctuation indicates more stable training, and larger loss fluctuation indicates less stable training.

(6) Back Propagation Algorithm

In a training process, a neural network may correct a value of a parameter of a neural network model by using an error back propagation (BP) algorithm, so that a reconstruction error loss of the neural network model becomes smaller. For example, an input signal is forward transferred until an error loss is generated during output, and the parameter of the neural network model is updated by using back propagation error loss information, to converge the error loss. The back propagation algorithm is an error-loss-centered back propagation motion intended to obtain a parameter, such as a weight matrix, of an optimal neural network model.

For example, a loss value generated during each training of the neural network model is transferred layer by layer from back to front in the neural network model. When the loss value is transferred to each layer, an update quantity of parameters at the layer is calculated (a partial derivative operation). The update quantity is related to a gradient. A value of gradient is in a linear positive correlation with the loss value.

After the gradient is obtained through calculation, parameters at each layer of the neural network need to be updated. An update direction is determined by the gradient, and the update quantity is determined by a learning rate (lr). The learning rate usually needs to be manually adjusted by algorithm personnel in a training process.

(7) Batch Normalization

The batch normalization (BN) is a data (or feature) processing manner applied to the deep neural network. For example, the batch normalization includes: subtracting input batch data (feature) from a mean value of the input batch data (feature), dividing the input batch data (feature) by a variance of the input batch data (feature), and then linearly adjusting a result. The layer is added to the deep neural network, so that fluctuation in a training process of the deep neural network can be effectively reduced, and a convergence speed of training is accelerated.

Figure 2:
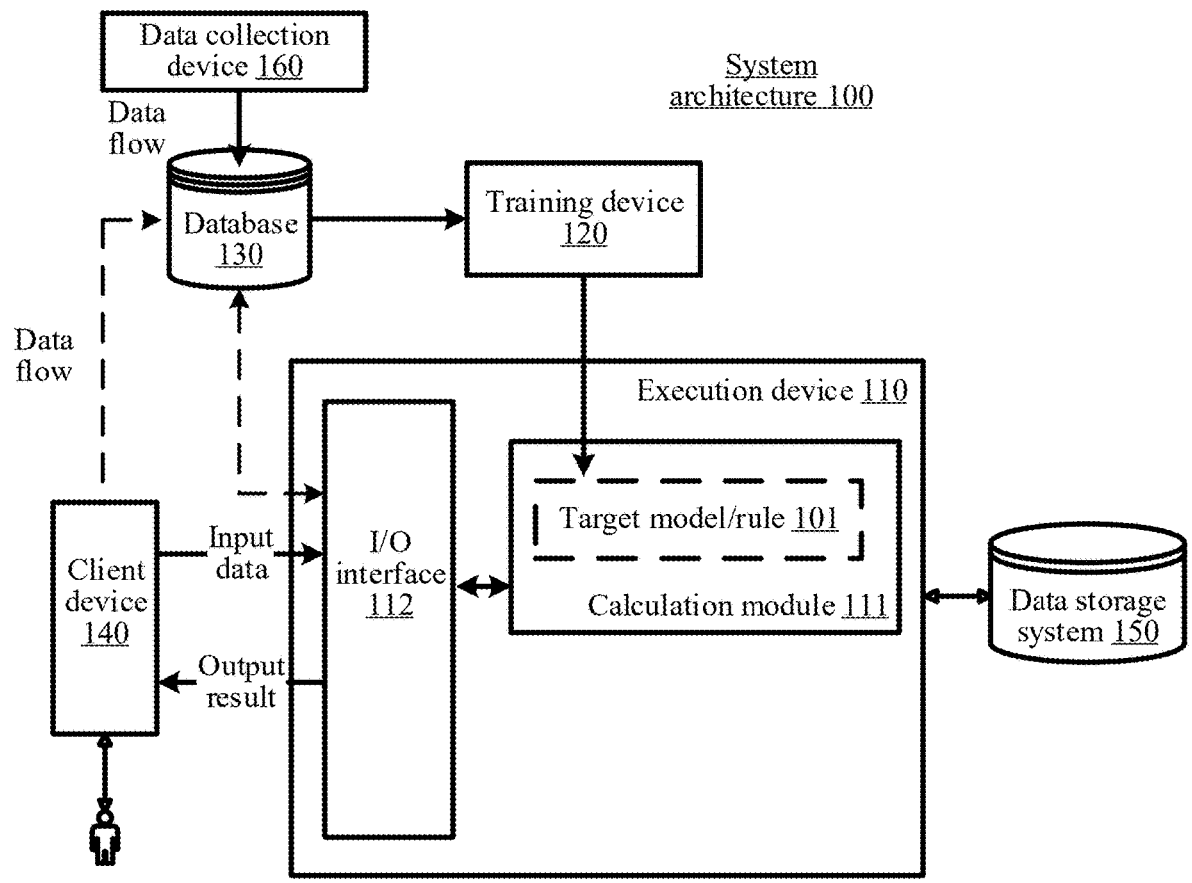
FIG. 2 is a schematic diagram of a structure of a system architecture according to an embodiment of this application.

FIG. 2 shows a system architecture 100 according to an embodiment of this application. In FIG. 2, a data collection device 160 is configured to collect training data. For an image processing method in embodiments of this application, the training data may include a training image and a classification result corresponding to the training image. The classification result of the training image may be a manually pre-labeled result.

After collecting the training data, the data collection device 160 stores the training data in a database 130, and a training device 120 performs training based on the training data maintained in the database 130 to obtain a target model/rule 101.

That the training device 120 performs training based on the training data to obtain a target model/rule 101 is described below. The training device 120 processes an input original image, and compares an output value with a target value, until a difference between the value output by the training device 120 and the target value is less than a specified threshold, to complete training of the target model/rule 101.

The target model/rule 101 can be used for implementing the image processing method in embodiments of this application. The target model/rule 101 in an embodiment of the application may be a neural network model, for example, a convolutional neural network or a residual network. It should be noted that, during actual application, the training data maintained in the database 130 is not necessarily all collected by the data collection device 160, and may be received from another device. In addition, it should be noted that the training device 120 may not necessarily perform training completely based on the training data maintained in the database 130 to obtain the target model/rule 101, or may obtain training data from a cloud or another place to perform model training. The foregoing descriptions should not be construed as a limitation on embodiments of this application.

The target model/rule 101 obtained through training by the training device 120 may be applied to different systems or devices, for example, an execution device 110 shown in FIG. 2. The execution device 110 may be a terminal such as a mobile phone terminal, a tablet computer, a laptop computer, an augmented reality (AR) AR/virtual reality (VR) terminal, or an in-vehicle terminal, or may be a server, a cloud, or the like. In FIG. 2, the execution device 110 is provided with an input/output (I/O) interface 112 configured to exchange data with an external device. A user may input data to the I/O interface 112 by using a client device 140. The input data in an embodiment of the application may include a to-be-processed image input by the client device.

In a process in which the execution device 110 preprocesses the input data, or in a process in which a calculation module 111 of the execution device 110 performs calculation, the execution device 110 may invoke data, code, and the like in a data storage system 150 for corresponding processing, and may further store, in the data storage system 150, data, instructions, and the like that are obtained through the corresponding processing.

Finally, the I/O interface 112 returns a processing result such as the foregoing obtained classification result of the image to the client device 140, to provide the processing result for the user.

It should be noted that the training device 120 may generate corresponding target models/rules 101 for different targets or different tasks based on different training data. The corresponding target models/rules 101 may be used to implement the foregoing targets or complete the foregoing tasks, to provide a required result for the user.

In a case shown in FIG. 2, the user may manually give input data, and the manual giving may be performed on an interface provided by the I/O interface 112. In another case, the client device 140 may automatically send input data to the I/O interface 112. If it is required that the client device 140 needs to obtain authorization from the user to automatically send the input data, the user may set corresponding permission on the client device 140. The user may view, on the client device 140, a result output by the execution device 110. For example, the result may be presented in a form of displaying, a sound, an action, or the like. The client device 140 may alternatively be used as a data collection end, to collect, as new sample data, input data input to the I/O interface 112 and an output result output from the I/O interface 112 that are shown in the figure, and store the new sample data in the database 130. It is clear that the client device 140 may alternatively not perform collection. Instead, the I/O interface 112 directly stores, in the database 130 as new sample data, the input data input to the I/O interface 112 and the output result output from the I/O interface 112.

It should be noted that FIG. 2 is merely a schematic diagram of a system architecture according to an embodiment of this application. A position relationship among devices, components, modules, and the like shown in the figure does not constitute any limitation. For example, in FIG. 2, the data storage system 150 is an external memory relative to the execution device 110. In another case, the data storage system 150 may alternatively be disposed in the execution device 110.

As shown in FIG. 2, the training device 120 performs training to obtain the target model/rule 101. The target model/rule 101 may be a neural network in this application in an embodiment of the application. For example, the neural network constructed in an embodiment of the application may be a CNN, a deep convolutional neural network (DCNN), a residual network, or the like.

Because the CNN is a very common neural network, a structure of the CNN is described below in detail with reference to FIG. 3. As described in the foregoing descriptions of basic concepts, the convolutional neural network is a deep neural network with a convolutional structure, and is of a deep learning architecture. The deep learning architecture is to perform multi-level learning at different abstract levels by using a neural network model update algorithm. As a deep learning architecture, the CNN is a feed-forward artificial neural network. Neurons in the feed-forward artificial neural network may respond to an input image.

Figure 3:
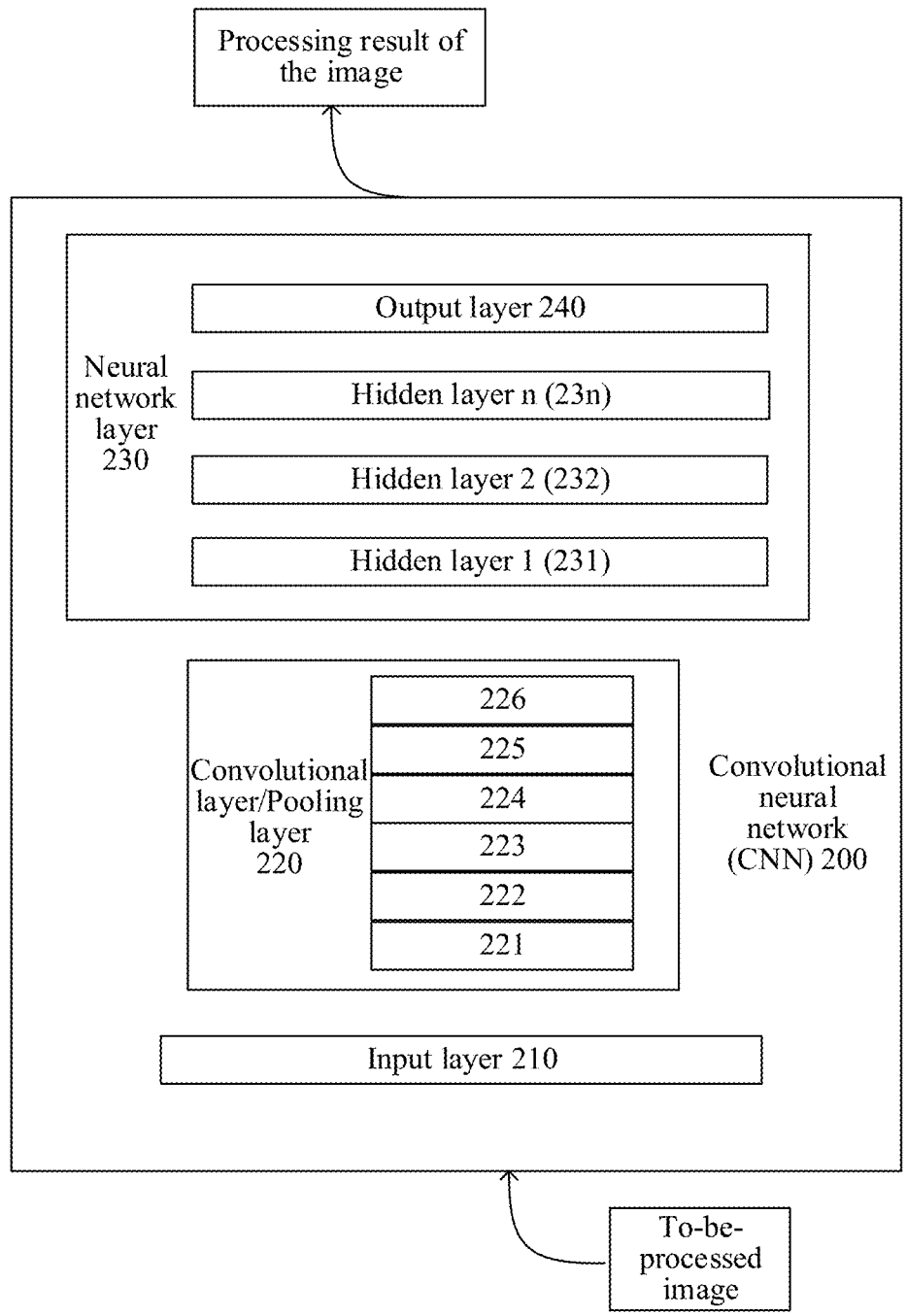
FIG. 3 is a schematic diagram of a structure of a convolutional neural network according to an embodiment of this application.

A structure of a neural network used in the image processing method in embodiments of this application may be shown in FIG. 3. In FIG. 3, a convolutional neural network (CNN) 200 may include an input layer 210, a convolutional layer/pooling layer 220 (the pooling layer is optional), and a neural network layer 230. The input layer 210 may obtain a to-be-processed image, and send the obtained to-be-processed image to the convolutional layer/pooling layer 220 and the subsequent neural network layer 230 for processing, to obtain a processing result of the image. The following describes in detail a structure of the layer in the CNN 200 in FIG. 3.

Convolutional Layer/Pooling Layer 220:

Convolutional Layer:

As shown in FIG. 3, the convolutional layer/pooling layer 220 may include layers 221 to 226 in examples. For example, in an embodiment, the layer 221 is a convolutional layer, the layer 222 is a pooling layer, the layer 223 is a convolutional layer, the layer 224 is a pooling layer, the layer 225 is a convolutional layer, and the layer 226 is a pooling layer. In an embodiment, the layers 221 and 222 are convolutional layers, the layer 223 is a pooling layer, the layers 224 and 225 are convolutional layers, and the layer 226 is a pooling layer. In other words, an output of a convolutional layer may be used as an input for a subsequent pooling layer, or may be used as an input for another convolutional layer, to continue to perform a convolution operation.

The following uses the convolutional layer 221 as an example to describe an internal working principle of one convolutional layer.

The convolutional layer 221 may include a plurality of convolution operators. The convolution operator is also referred to as a kernel. In image processing, the convolution operator functions as a filter that extracts information from an input image matrix. The convolution operator may essentially be a weight matrix, and the weight matrix is usually predefined. In a process of performing a convolution operation on an image, the weight matrix usually processes pixels at a granularity level of one pixel (or two pixels, depending on a value of a stride) in a horizontal direction on an input image, to extract a feature from the image. A size of the weight matrix should be related to a size of the image. It should be noted that a depth dimension of the weight matrix is the same as a depth dimension of the input image. During a convolution operation, the weight matrix extends to an entire depth of the input image. Therefore, a convolutional output of a single depth dimension is generated through convolution with a single weight matrix. However, in most cases, a single weight matrix is not used, but a plurality of weight matrices with a same size (rows×columns), namely, a plurality of same-type matrices, are applied. Outputs of the weight matrices are stacked to form a depth dimension of a convolutional image. The dimension herein may be understood as being determined based on the foregoing "plurality". Different weight matrices may be used to extract different features from the image. For example, one weight matrix is used to extract edge information of the image, another weight matrix is used to extract a color of the image, and a further weight matrix is used to blur unnecessary noise in the image. The plurality of weight matrices have the same size (rows×columns), and convolutional feature maps extracted from the plurality of weight matrices with the same size have a same size. Then, the plurality of extracted convolutional feature maps with the same size are combined to form an output of the convolution operation.

Weight values in these weight matrices need to be obtained through a lot of training during actual application. Each weight matrix formed by using the weight values obtained through training may be used to extract information from an input image, to enable the convolutional neural network 200 to perform correct prediction.

When the convolutional neural network 200 has a plurality of convolutional layers, a large quantity of general features are usually extracted at an initial convolutional layer (for example, 221). The general features may also be referred to as low-level features. As a depth of the convolutional neural network 200 increases, a deeper convolutional layer (for example, the layer 226) extracts more complex features, such as high-level semantic features. Higher-level semantic features are more applicable to a problem to be resolved.

Pooling Layer:

Because a quantity of training parameters usually needs to be reduced, a pooling layer usually needs to be periodically introduced after a convolutional layer. For example, for the layers 221 to 226 in the layer 220 shown in FIG. 3, one convolutional layer may be followed by one pooling layer, or a plurality of convolutional layers may be followed by one or more pooling layers. During image processing, the pooling layer is only used to reduce a space size of the image. The pooling layer may include an average pooling operator and/or a maximum pooling operator, to perform sampling on the input image to obtain an image with a small size. The average pooling operator may be used to calculate pixel values in the image in a range, to generate an average value. The average value is used as an average pooling result. The maximum pooling operator may be used to select a pixel with a maximum value in a range as a maximum pooling result. In addition, similar to that the size of the weight matrix at the convolutional layer needs to be related to the size of the image, an operator at the pooling layer also needs to be related to the size of the image. A size of a processed image output from the pooling layer may be less than a size of an image input to the pooling layer. Each pixel in the image output from the pooling layer represents an average value or a maximum value of a corresponding sub-region of the image input to the pooling layer.

Neural Network Layer 230:

After processing performed at the convolutional layer/pooling layer 220, the convolutional neural network 200 is not ready to output required output information. As described above, at the convolutional layer/pooling layer 220, only a feature is extracted, and parameters resulting from an input image are reduced. However, to generate final output information (required category information or other related information), the convolutional neural network 200 needs to use the neural network layer 230 to generate an output of one required category or outputs of a group of required categories. Therefore, the neural network layer 230 may include a plurality of hidden layers (231, 232, . . . , and 23$n$ shown in FIG. 3) and an output layer 240. Parameters included in the plurality of hidden layers may be obtained through pre-training based on related training data of a task type. For example, the task type may include image recognition, image classification, super-resolution image reconstruction, and the like.

At the neural network layer 230, the plurality of hidden layers are followed by the output layer 240, namely, a last layer of the entire convolutional neural network 200. The output layer 240 has a loss function similar to a categorical cross entropy, and the loss function is configured to calculate a prediction error. Once forward propagation (for example, propagation in a direction from 210 to 240 in FIG. 3) of the entire convolutional neural network 200 is completed, back propagation (for example, propagation in a direction from 240 to 210 in FIG. 3) is started to update a weight value and a deviation of each layer mentioned above, to reduce a loss of the convolutional neural network 200 and an error between a result output by the convolutional neural network 200 by using the output layer and an ideal result.

Figure 4:
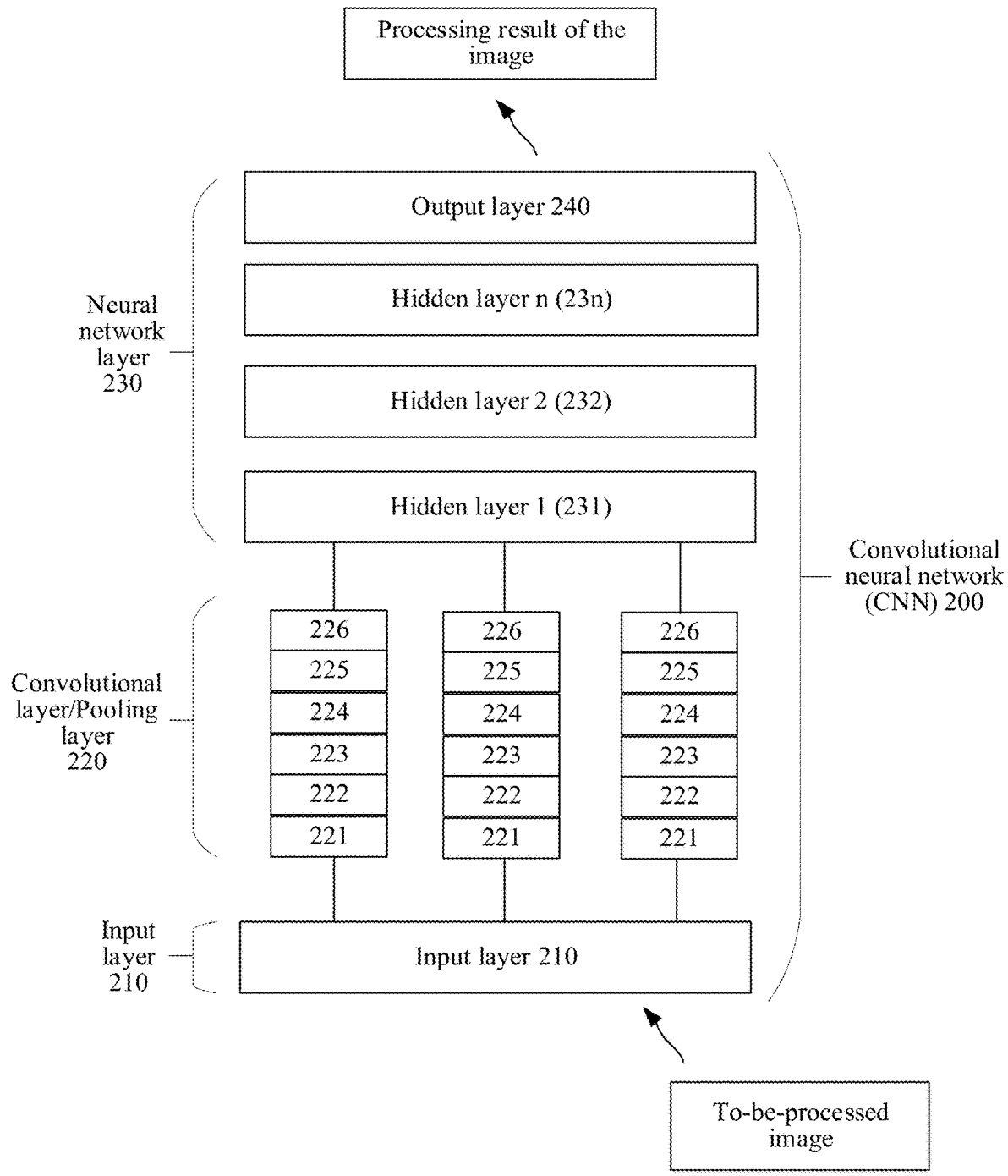
FIG. 4 is a schematic diagram of a structure of another convolutional neural network according to an embodiment of this application.

A structure of a neural network used in the image processing method in embodiments of this application may be shown in FIG. 4. In FIG. 4, a convolutional neural network (CNN) 200 may include an input layer 210, a convolutional layer/pooling layer 220 (the pooling layer is optional), and a neural network layer 230. Compared with FIG. 3, in FIG. 4, at the convolutional layer/pooling layer 220, a plurality of convolutional layers/pooling layers are in parallel, and extracted features are separately input to the neural network layer 230 for processing.

It should be noted that the convolutional neural network shown in FIG. 3 and the convolutional neural network shown in FIG. 4 are merely examples of two possible convolutional neural networks in the image processing method in embodiments of this application. In an embodiment, the convolutional neural network used in the image processing method in embodiments of this application may alternatively exist in a form of another network model.

In addition, a structure of a convolutional neural network obtained by using a neural network structure search method in embodiments of this application may be shown as the structure of the convolutional neural network in FIG. 3 and the structure of the convolutional neural network FIG. 4.

Figure 5:
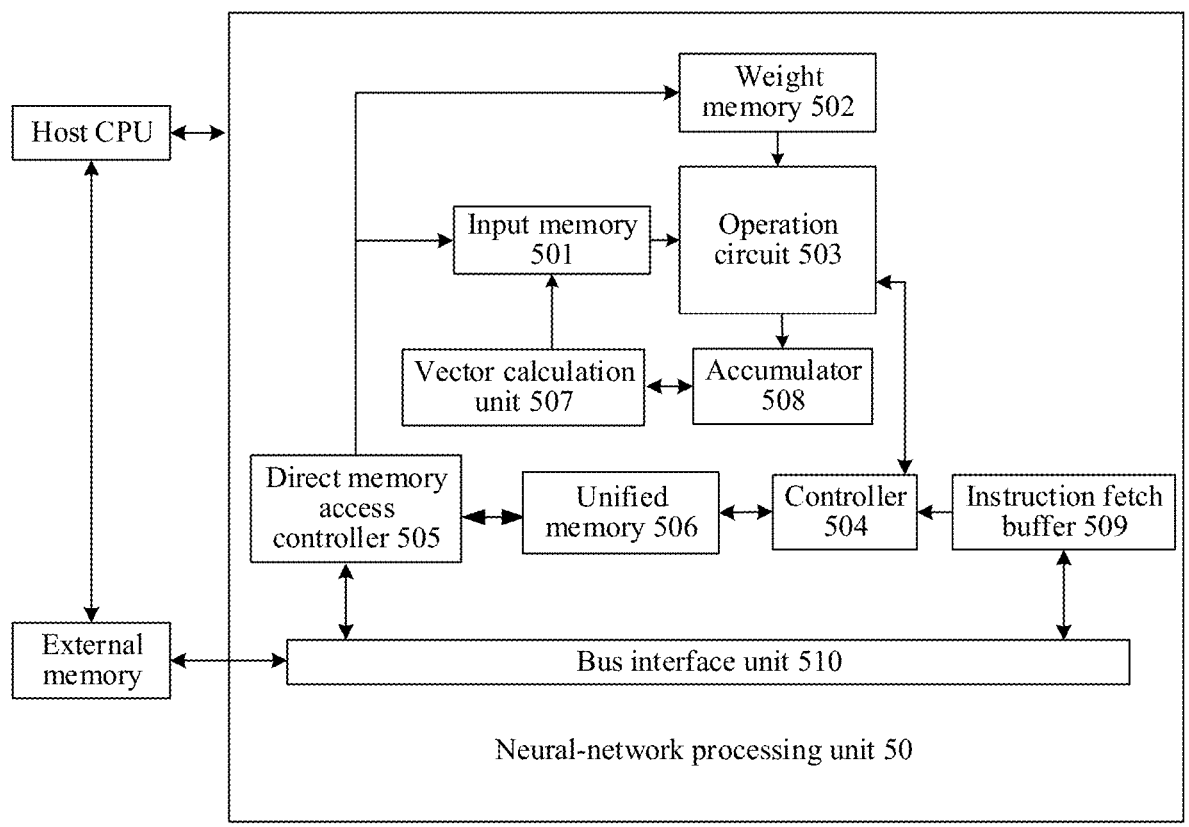
FIG. 5 is a schematic diagram of a hardware structure of a chip according to an embodiment of this application.

FIG. 5 is a schematic diagram of a hardware structure of a chip according to an embodiment of this application. The chip includes a neural-network processing unit 50. The chip may be disposed in the execution device 110 shown in FIG. 2, to complete calculation work of the calculation module 111. The chip may alternatively be disposed in the training device 120 shown in FIG. 1, to complete training work of the training device 120 and output the target model/rule 101. Algorithms at all layers of the convolutional neural network shown in FIG. 3 and FIG. 4 may be implemented in the chip shown in FIG. 5.

The neural-network processing unit NPU 50 serves as a coprocessor, and may be disposed on a host central processing unit (CPU) (host CPU). The host CPU assigns a task. A core part of the NPU is an operation circuit 503, and a controller 504 controls the operation circuit 503 to extract data in a memory (a weight memory or an input memory) and perform an operation.

In an embodiment, the operation circuit 503 includes a plurality of processing engines (PEs). In an embodiment, the operation circuit 503 is a two-dimensional systolic array. The operation circuit 503 may alternatively be a one-dimensional systolic array or another electronic circuit capable of performing mathematical operations such as multiplication and addition. In an embodiment, the operation circuit 503 is a general-purpose matrix processor.

For example, it is assumed that there are an input matrix A, a weight matrix B, and an output matrix C. The operation circuit fetches, from a weight memory 502, data corresponding to the matrix B, and buffers the data on each PE in the operation circuit. The operation circuit fetches data of the matrix A from an input memory 501, to perform a matrix operation on the matrix B, and stores an obtained partial result or an obtained final result of the matrix in an accumulator 508.

A vector calculation unit 507 may perform further processing on the output of the operation circuit, for example, vector multiplication, vector addition, exponential operation, logarithmic operation, and size comparison. For example, the vector calculation unit 507 may be configured to perform network calculation, such as pooling, batch normalization (BN), or local response normalization (local response normalization) at a non-convolutional/non-FC layer in a neural network.

In an embodiment, the vector calculation unit 507 can store a processed output vector in a unified buffer 506. For example, the vector calculation unit 507 may apply a non-linear function to an output, for example, a vector of an accumulated value, of the operation circuit 503 to generate an activation value. In an embodiment, the vector calculation unit 507 generates a normalized value, a combined value, or both a normalized value and a combined value. In an embodiment, the processed output vector can be used as an activated input to the operation circuit 503, for example, the processed output vector can be used at a subsequent layer of the neural network.

The unified memory 506 is configured to store input data and output data.

For weight data, a direct memory access controller (DMAC) 505 directly transfers input data in an external memory to the input memory 501 and/or the unified memory 506, stores weight data in the external memory in the weight memory 502, and stores data in the unified memory 506 in the external memory.

A bus interface unit (BIU) 510 is configured to implement interaction between the host CPU, the DMAC, and an instruction fetch buffer 509 by using a bus.

The instruction fetch memory (instruction fetch buffer) 509 connected to the controller 504 is configured to store instructions used by the controller 504. The controller 504 is configured to invoke the instructions buffered in the instruction fetch buffer 509, to control a working process of the operation accelerator.

Usually, the unified memory 506, the input memory 501, the weight memory 502, and the instruction fetch buffer 509 each are an on-chip memory. The external memory is a memory outside the NPU. The external memory may be a double data rate synchronous dynamic random access memory (DDR SDRAM), a high bandwidth memory (HBM), or another readable and writable memory.

An operation of each layer in the convolutional neural network shown in FIG. 3 or the convolutional neural network FIG. 4 may be performed by the operation circuit 503 or the vector calculation unit 507.

The execution device 110 in FIG. 2 described above can perform operations in the image processing method in embodiments of this application. The CNN model shown in FIG. 3 and the CNN model shown in FIG. 4 and the chip shown in FIG. 5 may also be configured to perform the operations in the image processing method in embodiments of this application.

The following describes in detail a neural network construction method in embodiments of this application and the image processing method in embodiments of this application with reference to the accompanying drawings.

Figure 6:
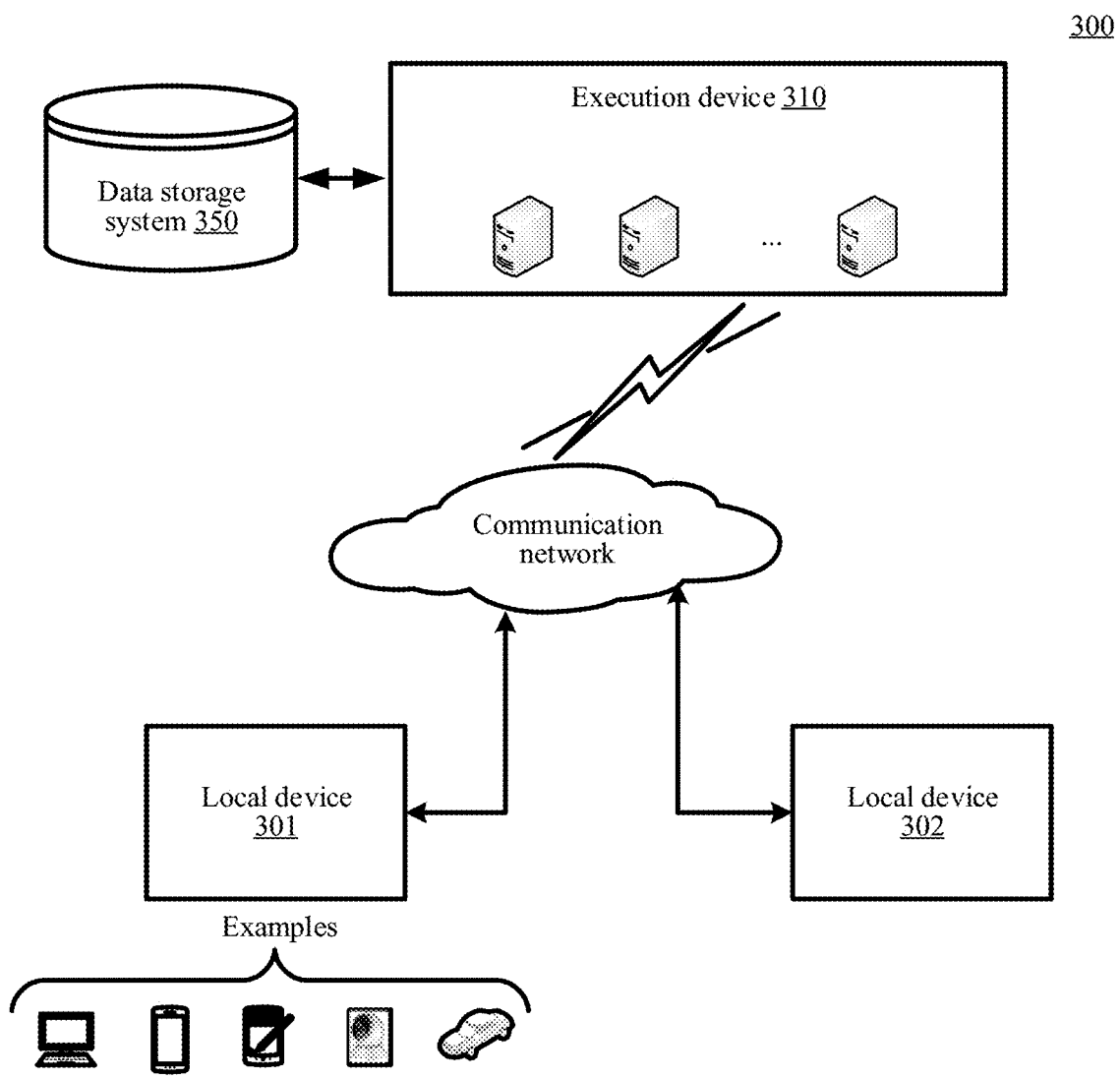
FIG. 6 is a schematic diagram of a system architecture according to an embodiment of this application.

FIG. 6 shows a system architecture 300 according to an embodiment of this application. The system architecture includes a local device 301, a local device 302, an execution device 310, and a data storage system 350. The local device 301 and the local device 302 are connected to the execution device 310 through a communication network.

The execution device 310 may be implemented by one or more servers. In an embodiment, the execution device 310 may cooperate with another computing device, for example, a device such as a data memory, a router, or a load balancer. The execution device 310 may be disposed on one physical site, or distributed on a plurality of physical sites. The execution device 310 may implement the neural network model update method in embodiments of this application by using data in the data storage system 350 or by invoking program code in the data storage system 350.

For example, in an embodiment, the execution device 110 may perform the following process:
  obtaining training data;
  inputting the training data to a neural network model for feature extraction, and obtaining a first prediction label based on an extracted feature;
  determining, based on the first prediction label and a real label of the training data, a function value of a first loss function corresponding to the first prediction label, where the function value of the first loss function corresponding to the first prediction label indicates a difference between the first prediction label and the real label of the training data;
  calculating a first weight gradient of the neural network model based on the function value of the first loss function corresponding to the first prediction label;
  obtaining a candidate weight parameter, where a partial derivative of a function value of a target loss function to the candidate weight parameter is 0, the function value of the target loss function is determined based on a function value of a second loss function corresponding to the first prediction label, the function value of the second loss function corresponding to the first prediction label indicates a difference between the candidate weight parameter and a weight parameter of the neural network model and a difference between a weight variation and the first weight gradient, and the weight variation is a difference between the candidate weight parameter and the weight parameter of the neural network model; and updating the parameter of the neural network model based on the candidate weight parameter.

The execution device 110 can obtain a target neural network model through the foregoing process, and the target neural network model may be used for image classification, image processing, or the like.

A user may operate a respective user equipment (for example, the local device 301 and the local device 302) to interact with the execution device 310. Each local device may be any computing device, such as a personal computer, a computer workstation, a smartphone, a tablet computer, an intelligent camera, a smart automobile, another type of cellular phone, a media consumption device, a wearable device, a set-top box, or a game console.

The local device of each user may interact with the execution device 310 through a communication network of any communication mechanism/communication standard. The communication network may be a wide area network, a local area network, a point-to-point connection, or any combination thereof.

In an embodiment, the local device 301 and the local device 302 obtain a related parameter of the target neural network from the execution device 310, deploy the target neural network on the local device 301 and the local device 302, and perform image classification, image processing, or the like by using the target neural network.

In an embodiment, the target neural network may be directly deployed on the execution device 310. The execution device 310 obtains a to-be-processed image from the local device 301 and the local device 302, and performs classification or another type of image processing on the to-be-processed image by using a target neural network model.

Alternatively, the execution device 310 may be a cloud device. In this case, the execution device 310 may be deployed on a cloud. Alternatively, the execution device 310 may be a terminal device. In this case, the execution device 310 may be deployed on a user terminal side. This is not limited in an embodiment of the application.

To provide a training speed of the neural network model and inference precision of the neural network model, a BN layer is usually added to the neural network model.

The BN is a data (feature) processing manner applied to a deep neural network. The BN layer is added to the deep neural network, so that fluctuation in a training process of the deep neural network can be effectively reduced, and a convergence speed of training is accelerated. In addition, noise sensitivity of the deep neural network is avoided to some extent, so that robustness is higher.

For example, the BN includes subtracting input batch data (feature) from a mean value of the input batch data (feature), dividing the input batch data (feature) by a variance of the input batch data (feature), and then linearly adjusting a result. In this process, an operation is mainly a non-matrix operation, and calculation complexity depends on a quantity of input batch data (features). Usually, the quantity of input batch data (features) is greater than 100,000. As a result, BN calculation complexity is very high.

When a main calculation core of a current mainstream neural network processing chip is a matrix operation, the BN cannot effectively use a matrix operation capability in the existing chip, and an overhead proportion in the entire deep neural network is large. For example, in a ResNet50, an overhead proportion of the BN is greater than 25%, which affects a speed of model iteration training. As a result, the BN becomes a performance bottleneck in deep neural network training.

Therefore, how to improve training efficiency of the neural network model becomes an urgent problem to be resolved.

Embodiments of this application provide a neural network model training method, to accelerate a training process and improve training efficiency of a neural network model.

Figure 7:
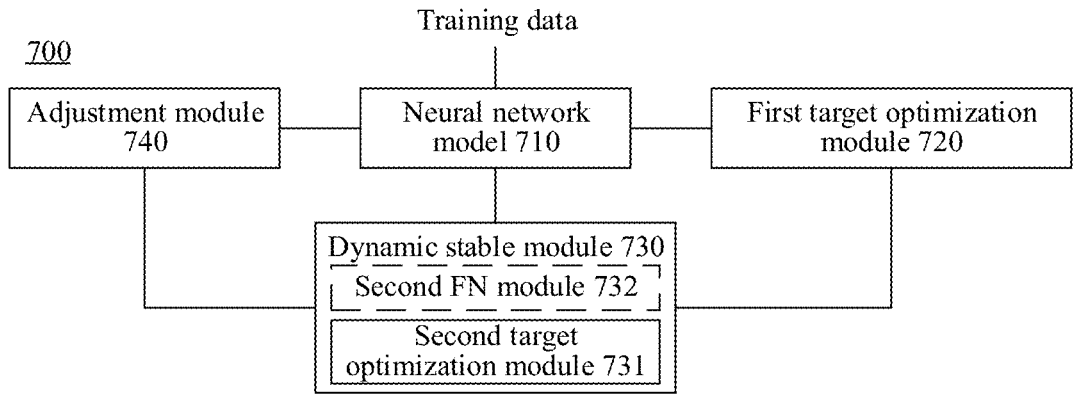
FIG. 7 is a schematic block diagram of a neural network model training apparatus according to an embodiment of this application.

FIG. 7 is a schematic diagram of a neural network model training apparatus 700 according to an embodiment of this application. To better understand the method in embodiments of this application, the following briefly describes functions of modules in FIG. 7.

The training apparatus 700 includes a neural network model 710, a target optimization module 720, a dynamic stable module 730, and an adjustment module 740.

The solutions in embodiments of this application can be used to train a plurality of structures of neural network models. For example, the neural network model 710 may be a residual network, a convolutional neural network, or the like.

In an embodiment, the neural network model 710 may include a first feature normalization layer, and the first feature normalization layer is located before an output layer of the neural network model, and is used to perform feature normalization processing on a feature input to the first feature normalization layer.

For example, the neural network model 710 may be located in the NPU 50 in FIG. 5. For example, the NPU 50 performs an operation in the neural network model 710. For example, the CPU allocates a task, and invokes training data, for example, image data, from the external memory to the memory 501 or the unified memory 506, so that the NPU 50 performs loading to perform the operation in the neural network model 710.

The first target optimization module 720 is configured to train the neural network model 710. The first target optimization module 720 provides an optimization target for the neural network model 710, and updates a parameter of the neural network model 710 based on the optimization target, until training of the neural network model 710 is completed. The optimization target may be a loss function or an objective function, and the target optimization module 720 may also be referred to as a target optimization layer.

For example, the first target optimization module 720 calculates a first weight gradient of the neural network model based on the first prediction label output by the neural network model, to determine a candidate weight parameter that minimizes a function value of a target loss function, and updates the parameter of the neural network model 710 based on the candidate weight parameter, until the training of the neural network model 710 is completed.

In an embodiment, the function value of the target loss function is determined based on a function value of a second loss function corresponding to the first prediction label. The function value of the second loss function corresponding to the first prediction label indicates a difference between the candidate weight parameter and the weight parameter of the neural network model and a difference between a weight variation and the first weight gradient, and the weight variation is the difference between the candidate weight parameter and the weight parameter of the neural network model.

For example, the target optimization module 720 may be located in the NPU 50 in FIG. 5. For example, the NPU 50 performs an operation in an optimization process of the neural network model.

The dynamic stable module (DSM) 730 includes a second target optimization module 731. The second target optimization module 731 is configured to collaborate with the first target optimization module 720 to train the neural network model 710.

The dynamic stable module 730 is located after any layer in the neural network model 710.

For example, the neural network model 710 may include a downsampling layer, and the dynamic stable module 730 may be located after the downsampling layer in the neural network model 710.

There may be one or more dynamic stable modules 730. For example, the neural network model 710 includes N downsampling layers. N is a positive integer. There are M dynamic stable modules 730, and the M dynamic stable modules 730 are respectively located after M downsampling layers of the N downsampling layers. M is a positive integer less than or equal to N.

It should be noted that the foregoing is merely an example. A quantity and positions of dynamic stable modules 730 may be set based on a requirement. This is not limited in an embodiment of the application.

For example, the second target optimization module 731 obtains a second prediction label based on a feature output by any layer in the neural network model, and calculates a second weight gradient of the neural network model based on the second prediction label. The second target optimization module 731 collaborates with the first target optimization module 720, to determine the candidate weight parameter that minimizes the function value of the target loss function, and updates the parameter of the neural network model 710 based on the candidate weight parameter, until the training of the neural network model 710 is completed.

A collaborative effect between the second target optimization module 731 and the first target optimization module 720 means that the function value of the target loss function is determined by the two modules together. For example, the function value of the target loss function is determined based on the function value of the second loss function corresponding to the first prediction label and a function value of the second loss function corresponding to the second prediction label, and the function value of the second loss function corresponding to the second prediction label indicates the difference between the candidate weight parameter and the weight parameter of the neural network model and a difference between the weight variation and the second weight gradient.

Further, the dynamic stable module 730 may further include a second feature normalization (FN) module 732.

The second FN module 732 is configured to perform feature normalization processing on a feature input to the second FN module 732.

For example, the second FN module 732 is located after the downsampling layer of the neural network model. For example, the second FN module 732 may perform feature normalization processing on a feature output by the downsampling layer. In this case, that the second target optimization module 731 obtains a second prediction label based on the feature output by the downsampling layer in the neural network model may be as follows: The second target optimization module 731 obtains the second prediction label based on a result obtained through normalization processing.

It should be noted that there may be one or more dynamic stable modules 730, one or more second target optimization modules 731, and one or more second FN modules 732. Therefore, there may be one or more function values of the second loss function corresponding to the second prediction label. For example, the quantity of dynamic stable modules 730 may be equal to a quantity of downsampling layers in the neural network model. In other words, the dynamic stable module 730 may be in a one-to-one correspondence with the downsampling layer.

For example, the dynamic stable module 730 may be located in the NPU 50 in FIG. 5. For example, the NPU 50 performs an operation that needs to be performed by the dynamic stable module 730.

The adjustment module 740 is configured to control the dynamic stable module 730. For example, the adjustment module 740 may enable some or all of the dynamic stable modules 730 or disable some or all of the dynamic stable modules 730.

The adjustment module 740 may send an enable signal or a disable signal to the dynamic stable module 730 based on a training status of the neural network model.

In an embodiment, the adjustment module 740 may adjust, based on a quantity of update times, a weight that corresponds to the function value of the second loss function corresponding to the second prediction label and that is in the function value of the target loss function. For example, when the training starts, the adjustment module 740 may enable some or all of the dynamic stable modules 730. As the quantity of update times increases, the weight continuously decreases. When the weight decreases to 0, it may be understood that the adjustment module 740 disables some or all of the dynamic stable modules 730.

In an embodiment of the application, the quantity of update times may also be understood as a quantity of iteration times.

For example, the adjustment module 740 may be located in the host CPU in FIG. 5. For example, the host CPU executes instructions that need to be executed by the adjustment module 730, for example, sends an enable signal or a disable signal to the dynamic stable module 730.

In an inference phase, the trained neural network model 710 is deployed based on a requirement, and to-be-processed data is processed by using the trained neural network model, to obtain a processing result.

For example, the neural network model 710 may be used for image processing, and the inference phase is an image processing phase.

In the image processing phase, only the trained neural network model 710 needs to be deployed, a to-be-processed image is input to the trained neural network model 710, and the image is processed by using the trained neural network model 710, to obtain an image processing result.

For descriptions of the foregoing training phase, refer to the following method 800. For descriptions of the inference phase, refer to the following method 900.

According to the method in an embodiment of the application, a parameter fluctuation range in a training process is controlled, to ensure controllability of gradient fluctuation, avoid training divergence and poor generalization caused by the gradient fluctuation, improve training stability, and accelerate the training process. In addition, the first loss function is used to continuously improve inference precision of the neural network model in the training process, and the second loss function can be in a convergence trend consistent with the first loss function. This ensures the inference precision of the neural network model. For example, the solution in an embodiment of the application may be used to optimize a training process of an original neural network model. The first loss function may be understood as an original loss function of the neural network model. The original loss function is used to enable the prediction label output by the trained neural network model to be the same as the real label of the training data as much as possible. According to the solution in an embodiment of the application, the training stability can be improved and the training process can be accelerated when it can be ensured that an original prediction task is implemented or original inference precision is ensured.

The following describes in detail neural network model training methods in embodiments of this application with reference to FIG. 8 to FIG. 11.

Figure 8:
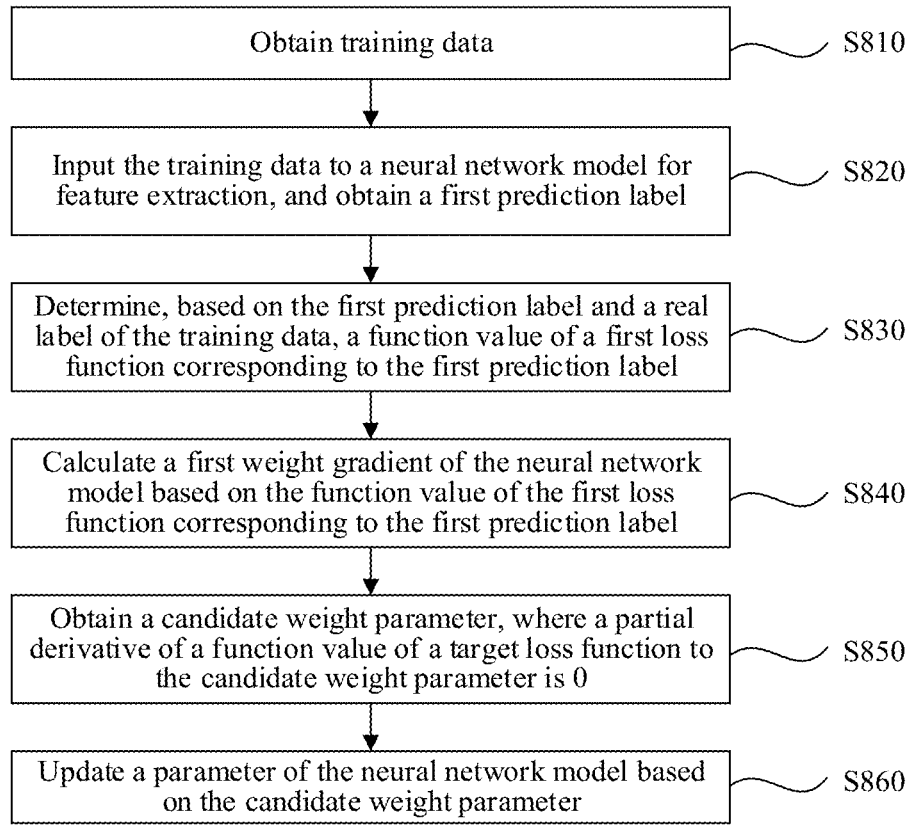
FIG. 8 is a schematic flowchart of a neural network model training method according to an embodiment of this application.

FIG. 8 shows a neural network model training method 800 according to an embodiment of this application. The method shown in FIG. 8 may be performed by a neural network model training apparatus. The training apparatus may be a cloud service device, or may be a terminal device, for example, an apparatus such as a computer or a server that has an operation capability sufficient to perform the neural network model training method, or may be a system including the cloud service device and the terminal device. For example, the method 800 may be performed by the training device 120 in FIG. 2, the neural-network processing unit 50 in FIG. 5, the execution device 310 in FIG. 6, or a local device.

For example, the method 800 may be performed by the training device 120 shown in FIG. 2, and training data in the method 800 may be training data maintained in the database 130 shown in FIG. 2.

The method 800 includes operation S810 to operation S860. The following describes operation S810 to operation S860 in detail.

S810: Obtain training data.

A type of the training data is related to a task of the neural network model. For example, if the neural network model is used for image processing, the training data may be an image. For example, the neural network model may be used for image classification, image detection, image segmentation, image generation, or another task. For another example, if the neural network model is used for text recognition, the training data may be a text. A type of the training data is not limited in an embodiment of the application.

For example, the training data may be stored in the external memory shown in FIG. 5, and is invoked by using the host CPU to the NPU 50 for processing.

S820: Input the training data to a neural network model for feature extraction, and obtain a first prediction label based on an extracted feature. A type of the label is related to a processing task of the neural network model. For example, if the neural network model is used for image classification, the label may indicate a category of an image. The real label of the training data is a real category of the image. The prediction label may be a prediction category of the image or a prediction probability of the category of the image. The prediction label is an output of the neural network model, and the real label of the training data is a target output of the neural network model. For example, the real label of the training data may be a manually pre-labeled result.

For example, the neural network model may be the neural network model 710 in the apparatus 700.

For example, the neural network model may be the convolutional neural network shown in FIG. 3 or FIG. 4. For another example, the neural network model may be a residual network. A type of the neural network model is not limited in an embodiment of the application.

Alternatively, an original neural network model includes a BN layer. In this case, the method 800 further includes: deleting the BN layer from the original neural network model, to obtain the neural network model. In other words, in an embodiment of the application, the neural network model for training is the neural network model obtained after the BN layer is deleted. It should be understood that, in this case, the neural network model obtained through training does not include the deleted BN layer.

Figure 10:
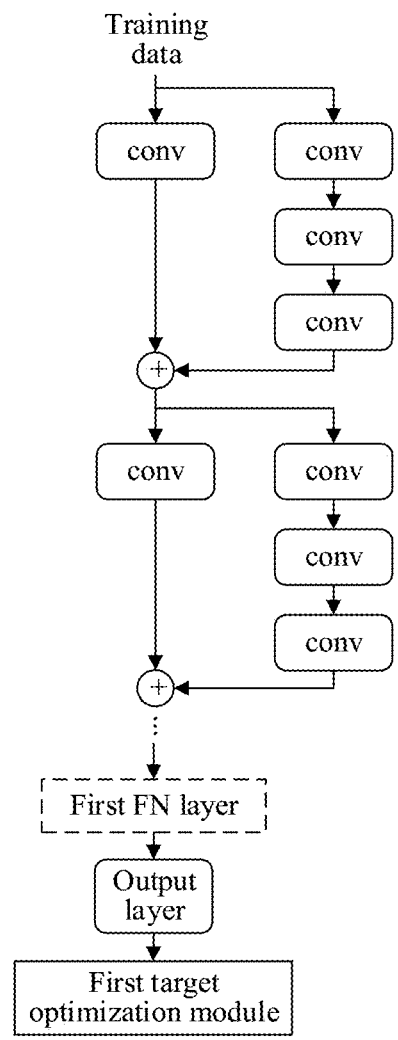
FIG. 10 is a schematic block diagram of a neural network model according to an embodiment of this application.

FIG. 10 is a schematic diagram of a neural network model according to an embodiment of this application. The method 800 may be performed based on the neural network model shown in FIG. 10. conv represents a convolutional layer. A first FN layer in FIG. 10 may be a first FN module in the apparatus 700. A first target optimization module in FIG. 10 may be the first target optimization module 720 in the apparatus 700.

For example, the neural network model may be input by a user.

For example, the user inputs the neural network model shown in FIG. 10 to obtain a trained neural network model.

For another example, the user inputs an original neural network model including a BN layer. In this case, the method 800 further includes: deleting the BN layer from the original neural network model. After training is completed, the trained neural network model that is fed back to the user does not include the deleted BN layer.

For example, training data is input to the neural network model for forward propagation, to obtain a first prediction label.

For example, if the training data is an image, and the neural network model is used for image classification, an output layer of the neural network model is a classification layer, for example, a softmax layer, and the output layer outputs a first prediction label. The first prediction label may indicate a prediction probability of a category of the image.

In an embodiment, the neural network model includes a first feature normalization layer. The first feature normalization layer is used to perform feature normalization processing on a feature input to the first feature normalization layer. The first feature normalization layer is located before the output layer of the neural network model.

The first FN layer performs feature normalization processing on the feature input to the first FN layer, and inputs a processing result to the output layer of the neural network model, and the output layer outputs the first prediction label, for example, as shown in FIG. 10.

For example, feature normalization processing may be: dividing an input feature by a square root of all the input features. For example, the result of the feature normalization processing may satisfy the following formula:

$$\hat{x}_i = \frac{x_i}{\sqrt{\sum_{i=1}^{m} x_i^2}},$$

where $x_i$ represents an $i^{th}$ input feature, m represents a quantity of input features, and $\hat{x}_i$ represents a result obtained by performing feature normalization on the $i^{th}$ input feature.

Figure 9:
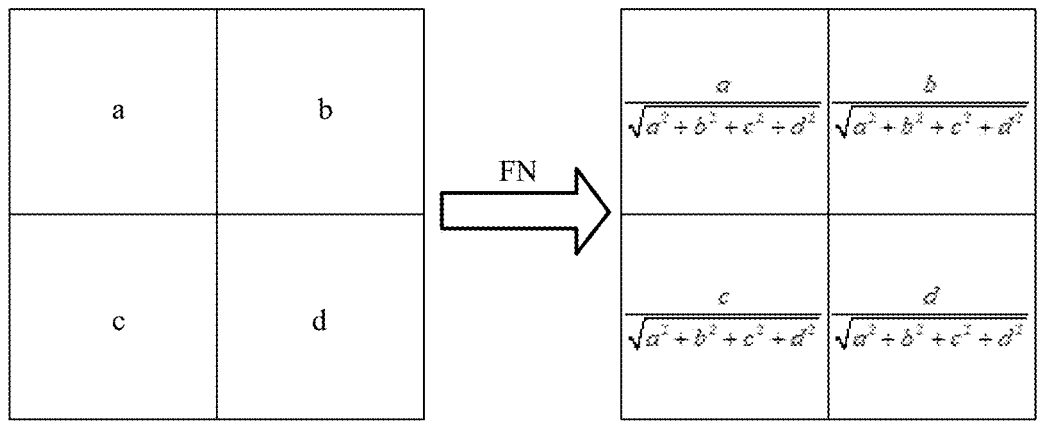
FIG. 9 is a schematic flowchart of feature normalization processing according to an embodiment of this application.

FIG. 9 is a schematic diagram of a feature normalization processing process according to an embodiment of this application. As shown in FIG. 9, input features a, b, c, and d are four feature values, and output results through feature normalization processing are respectively $$\frac{a}{\sqrt{a^2+b^2+c^2+d^2}}, \frac{b}{\sqrt{a^2+b^2+c^2+d^2}},$$
$$\frac{c}{\sqrt{a^2+b^2+c^2+d^2}}, \text{and} \frac{d}{\sqrt{a^2+b^2+c^2+d^2}}.$$

It should be understood that the foregoing is merely an example. Another feature normalization processing method may also be used in the method 800. An implementation of feature normalization processing is not limited in an embodiment of the application.

S830: Determine, based on the first prediction label and a real label of the training data, a function value of a first loss function corresponding to the first prediction label.

The function value of the first loss function indicates a difference between the prediction label of the neural network model and the real label of the training data.

A type of the first loss function is related to a task of the neural network model. For example, if the neural network model is used for image processing, the first loss function may be a cross-entropy loss function. The type of the first loss function is not limited in an embodiment of the application.

Correspondingly, the function value of the first loss function corresponding to the first prediction label indicates a difference between the first prediction label and the real label of the training data.

For example, operation S830 may be performed by the first target optimization module 720 in the apparatus 700 or the first target optimization module in FIG. 10.

S840: Calculate a first weight gradient of the neural network model based on the function value of the first loss function corresponding to the first prediction label.

For example, the first weight gradient of the neural network model is calculated by back propagating the function value of the first loss function corresponding to the first prediction label.

For example, operation S840 may be performed by the first target optimization module 720 in the apparatus 700 or the first target optimization module in FIG. 10.

S850: Obtain a candidate weight parameter, where a partial derivative of a function value of a target loss function to the candidate weight parameter is 0. In other words, the candidate weight parameter is a weight parameter that minimizes the function value of the target loss function.

The function value of the target loss function is determined based on a function value of a second loss function corresponding to the first prediction label. In this case, the candidate weight parameter is a weight parameter that minimizes the function value of the second loss function corresponding to the first prediction label.

The function value of the second loss function indicates a difference between the candidate weight parameter and a weight parameter of the current neural network model and a difference between a weight variation and a weight gradient value. The weight variation is the difference between the candidate weight parameter and the weight parameter of the current neural network model.

Correspondingly, the function value of the second loss function corresponding to the first prediction label indicates the difference between the candidate weight parameter and the weight parameter of the current neural network model and a difference between the weight variation and a first weight gradient value.

For example, the function value of the second loss function indicates a sum of the difference between the candidate weight parameter and the weight parameter of the neural network model and the difference between the weight variation and the weight gradient.

Correspondingly, the function value of the second loss function corresponding to the first prediction label indicates a sum of the difference between the candidate weight parameter and the weight parameter of the neural network model and the difference between the weight variation and the first weight gradient.

For example, the second loss function $L_{new}$ may satisfy the following formula:

$$L_{new}=\lambda_1 * d_1(w-w_k, \nabla_w^L) + \lambda_2 * d_2(w, w_k).$$

That is, the candidate weight parameter w may satisfy the following formula:

$$w = \mathrm{argmin}_w L_{new} = \mathrm{argmin}_w \lambda_1 * d_1(w-w_k, \nabla_w^L) + \lambda_2 * d_2(w, w_k).$$

w represents the candidate weight parameter, and $w_k$ represents a weight parameter of a neural network model obtained through $k^{th}$ iteration time, namely, a weight parameter of the current neural network model. $\nabla_w^L$ represents the weight gradient value of the neural network model. For example, when the function value of the second loss function corresponding to the first prediction label is calculated, $\nabla_w^L$ is the first weight gradient. $d_1$ represents a function indicating the difference between the weight variation and the weight gradient. The difference between the weight variation and the weight gradient may be used to measure a direction of the weight gradient. Therefore, it may also be understood that $d_1$ is the function used to measure the direction of the weight gradient. For example, $d_1$ may be a distance measurement function. In other words, the difference between the weight variation $w-w_k$ and $\nabla_w^L$ is represented by using a distance between the weight variation $w-w_k$ and $\nabla_w^L$. For example, the distance function may be used to calculate a square or an absolute value of the difference between $w-w_k$ and $\nabla_w^L$. In other words, the distance between $w-w_k$ and $\nabla_w^L$ is represented by using the square or the absolute value of the difference between $w-w_k$ and $\nabla_w^L$. For another example, $d_1$ may be a cosine similarity function. $d_2$ represents a function indicating the difference between the candidate weight parameter and the weight parameter of the current neural network model. The difference between the candidate weight parameter and the weight parameter of the current neural network model may be used to measure an amplitude of the weight gradient. Therefore, it may also be understood that $d_2$ is the function used to measure the amplitude of the weight gradient. For example, $d_2$ may be a distance measurement function. In other words, the difference between w and $w_k$ is represented by using a distance between w and $w_k$. For example, the distance function may be used to calculate a square or an absolute value of the difference between w and $w_k$. In other words, the distance between w and $w_k$ is represented by using the square or the absolute value of the difference between w and $w_k$. For another example, $d_2$ may be a cosine similarity function. $\lambda_1$ represents a weight corresponding to $d_1$, and $\lambda_2$ represents a weight corresponding to $d_2$. The weight may be set based on a requirement. For example, $\lambda_1=0.4$, and $\lambda_2=0.6$.

It should be noted that $d_1$ is merely an example, and $d_1$ may alternatively be another metric function, provided that the metric function can indicate the difference between the weight variation and the weight gradient. $d_2$ is merely an example, and $d_2$ may alternatively be another metric function, provided that the metric function can indicate the difference between the candidate weight parameter and the weight parameter of the current neural network model. A manner used by $d_1$ and $d_2$ is not limited in an embodiment of the application.

For example, the candidate weight parameter may be obtained by making the partial derivative of $L_{new}$ to w be 0. The candidate weight parameter is a weight parameter that minimizes the function value of $L_{new}$.

For example, a partial derivative of $L_{new}$ to w is calculated, and a weight parameter that makes the partial derivative be 0 is a candidate weight parameter that minimizes the function value of the target loss function.

The first loss function is used to enable the first prediction label output by the trained neural network model to be the same as the real label of the training data as much as possible. The function $d_1$ can enable an update direction of the weight parameter of the neural network model (an update direction indicated by $w-w_k$) to be as consistent as possible with an update direction indicated by the first loss function (an update direction indicated by $\nabla_w^L$), to ensure that convergence in the training process is consistent with that of the first loss function, and achieve gradual convergence. In other words, the neural network model can be trained in a direction in which the function value of the first loss function is reduced, to ensure inference precision of the trained neural network model. In other words, the function $d_1$ in the second loss function is compatible with the first loss function. The function $d_2$ in the second loss function can control a jump amplitude between an updated weight parameter and the current weight parameter, to control a fluctuation range of the weight parameter, avoid a sharp jump of the updated weight parameter, improve training stability, accelerate a convergence process, and improve training efficiency.

For example, operation S850 may be performed by the target optimization module 720 in the apparatus 700 or the first target optimization module in FIG. 10.

S860: Update a parameter of the neural network model based on the candidate weight parameter.

The updating a parameter of the neural network model is training the neural network model.

For example, operation S860 may be: using the candidate weight parameter as an updated weight parameter of the neural network model.

In an embodiment, operation S860 may be: updating a parameter of the neural network model based on the candidate weight parameter and a learning rate, where the learning rate indicates a change amplitude of the weight parameter of the neural network model.

For example, the updated weight parameter of the neural network model may satisfy the following formula:

$w_{k+1}=(w-w_k)*lr+w_k$, where $w_{k+1}$ represents a weight parameter of a neural network model obtained through $(k+1)^{th}$ iteration time, namely, the updated weight parameter of the neural network model obtained through current iteration time, and lr represents the learning rate.

By setting the learning rate, a process of updating the parameter can be smoothed, to further control a parameter fluctuation range, further improve training stability, accelerate a convergence process, and improve training efficiency.

For example, operation S860 may be performed by the target optimization module 720 in the apparatus 700 or the first target optimization module in FIG. 10.

Operation S810 to operation S860 are repeated, until the training of the neural network model is completed.

For example, operation S810 to operation S860 are repeated, until the training of the neural network model meets a training termination condition. In other words, the training is completed, and the trained neural network model is obtained.

The training termination condition may be set based on a requirement.

For example, that the training of the neural network model meets a training termination condition includes: inference precision of the neural network model meets a preset condition.

For example, the inference precision of the neural network model is greater than or equal to a first threshold. In other words, when the neural network model tends to converge, the training is terminated.

For another example, a variation of inference precision of a neural network model obtained through P consecutive update times is less than or equal to a second threshold. In other words, when the inference precision tends to be stable, or the inference precision no longer significantly increases, the training is terminated.

It should be understood that the training termination condition of the neural network model is merely an example, and the training termination condition is not limited in an embodiment of the application. For example, the training termination condition of the neural network model may further include: a quantity of iteration times is greater than or equal to a preset quantity of times.

In an embodiment, the solution in an embodiment of the application may be used to optimize a training process of an original neural network model. The first loss function may be an original loss function of the neural network model. As described above, the first target optimization module 720 may be understood as a target optimization layer after an output layer of the neural network module. In the training process of the original neural network model, an original target optimization layer updates the weight parameter of the neural network model based on the function value of the first loss function. In the training process of the method 800, the first target optimization module 720 updates the weight parameter of the neural network model based on the function value of the target loss function. In other words, without changing a structure of the neural network model, the target optimization layer in the training process of the original neural network model may be replaced with the target optimization layer in an embodiment of the application. That is, training can be performed by using the solution in an embodiment of the application. If the original neural network model includes a BN layer, the BN layer may be deleted, and the target optimization layer in the training process of the original neural network model is then replaced with the target optimization layer in an embodiment of the application. That is, training can be performed by using the solution in an embodiment of the application, and the neural network model obtained through training does not include the deleted BN layer.

In an embodiment of the application, the difference between the candidate weight parameter and the weight parameter of the neural network model is controlled by using the second loss function, to control a parameter fluctuation range in the training process. This ensures controllability of gradient fluctuation, avoids training divergence and poor generalization caused by the gradient fluctuation, improves training stability, accelerates the training process, and improves training efficiency. In addition, the first loss function is used to continuously improve the inference precision of the neural network model in the training process, and the second loss function can be in a convergence trend consistent with the first loss function. This improves the inference precision of the neural network model. For example, the solution in an embodiment of the application may be used to optimize a training process of an original neural network model. The first loss function may be understood as an original loss function of the neural network model. The original loss function is used to enable the prediction label output by the trained neural network model to be the same as the real label of the training data as much as possible. According to the solution in an embodiment of the application, by adding a constraint on the gradient direction and size, the training stability is improved and the training process is accelerated when it can be ensured that an original prediction task is implemented. This solution is universally applicable a plurality of deep neural network models.

In addition, training overheads of the neural network model using the first loss function are almost the same as those of the neural network model using the target loss function. In other words, in comparison with the neural network model using the first loss function, the solution in an embodiment of the application can improve a training speed and inference precision of the neural network model without increasing the overheads. An existing neural network model usually uses the first loss function. In the solution in an embodiment of the application, a new optimization target, namely, the target loss function, is set based on only the existing neural network model. This is equivalent to that only a calculation process of the candidate weight parameter is added, and almost no overheads are increased. Further, compared with the neural network model using a BN module or the like, the solution in an embodiment of the application can achieve a same convergence speed and same inference precision as the neural network model using the BN module or the like, and can effectively use a calculation capability of a processor, and required training overheads are far less than training overheads required by the neural network model using the BN module or the like. The solution in an embodiment of the application greatly reduces training resources and training costs. In addition, the same training resources can support training of more neural network models.

In addition, the solution in an embodiment of the application may be completed based on the existing neural network. For example, the new optimization target is set based on the existing neural network model, an original optimization target can be replaced without user perception, in other words, without making any modification by a user, and acceleration of the training of the neural network model can be automatically completed. This improves training efficiency and user experience.

In an embodiment, the function value of the target loss function is determined based on the function value of the second loss function corresponding to the first prediction label and a function value of the second loss function corresponding to at least one second prediction label. The function value of the second loss function corresponding to the at least one second prediction label indicates the difference between the candidate weight parameter and the weight parameter of the neural network model and a difference between the weight variation and a second weight gradient.

Figure 11:
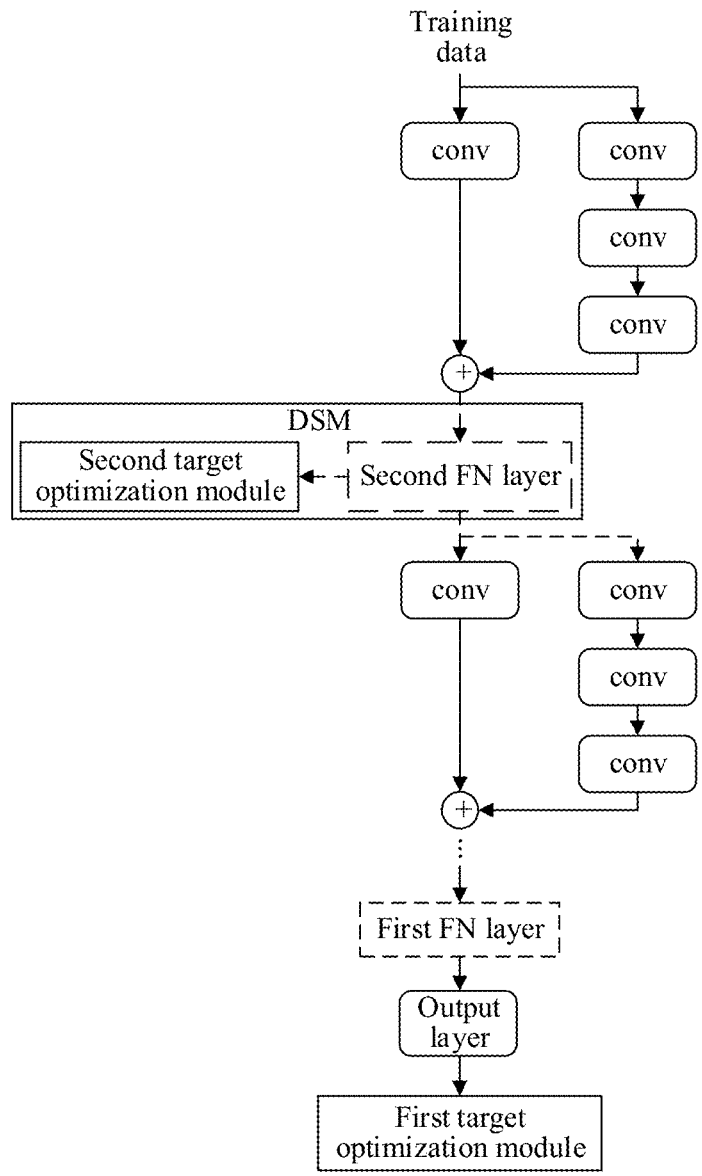
FIG. 11 is a schematic block diagram of another neural network model according to an embodiment of this application.

In this case, FIG. 11 is a schematic diagram of a neural network model according to an embodiment of this application. The method 800 may be performed based on the neural network model shown in FIG. 11. A DSM in FIG. 11 may be the DSM 730 in the apparatus 700. The DSM in FIG. 11 is located after a downsampling layer in the neural network model. It should be noted that FIG. 11 is merely an example, and the DSM may alternatively be located at another position in the neural network model. This is not limited in an embodiment of the application.

For example, a second weight gradient may be obtained through operation S1 to operation S3.

For example, operation S1 to operation S3 may be performed by the dynamic stable module in FIG. 11. For descriptions of the dynamic stable module, refer to the dynamic stable module 730 in the apparatus 700.

It should be understood that, a quantity of DSMs in FIG. 11 is merely an example, and more or fewer dynamic stable modules may be further disposed in a training process.

The following describes operation S1 to operation S3.

S1: Obtain at least one second prediction label based on a feature output by at least one layer in a neural network model.

The at least one layer may be any layer or a plurality of layers in the neural network model.

For example, the neural network model may include at least one downsampling layer, and the at least one layer may be the at least one downsampling layer. Operation S1 may include: obtaining at least one second prediction label based on a feature output by at least one downsampling layer in the neural network model.

The downsampling layer is a layer that enables a resolution of an output feature map to be less than a resolution of an input feature map.

If the neural network model includes N downsampling layers, the neural network model includes N resolution downgrade positions. In operation S1, M second prediction labels may be obtained based on a feature output by M downsampling layers of the N downsampling layers. N is a positive integer. M is a positive integer less than or equal to N.

For example, there may be M dynamic stable modules in FIG. 11, each DSM is disposed after one downsampling layer, and a second target optimization module in the DSM may be configured to perform operation S1.

For example, the obtaining at least one second prediction label based on a feature output by at least one layer in a neural network model may be: inputting the feature output by the at least one layer to a corresponding output layer, to obtain the at least one second prediction label.

For example, the obtaining M second prediction labels based on feature output by M downsampling layers may be: respectively inputting the feature output by the M downsampling layers to M output layers, to obtain the M second prediction labels.

The output layers have a same structure as an origin output layer of the neural network model. The structure of the output layer is related to a task of the neural network model. For example, when the neural network model is used for image classification, the output layer may also be referred to as a classification layer. For example, the classification layer may be a softmax layer, and the softmax layer may output a predicted classification label of an image.

Further, the obtaining M second prediction labels based on a feature output by M downsampling layers may be: sequentially and respectively inputting the feature output by the M downsampling layers to M global pooling layers, M fully connected layers, and M output layers, to obtain the M second prediction labels.

In an embodiment, the neural network model includes at least one second feature normalization layer, and the at least one second feature normalization layer is respectively located after the at least one downsampling layer, and is used to perform feature normalization processing on a feature input to the at least one second feature normalization layer.

In this case, operation S1 may include: respectively inputting the feature output by the at least one downsampling layer in the neural network model to at least one second FN layer for feature normalization processing, and obtaining the at least one second prediction label based on a processing result. For example, the second FN layer may be considered as a second FN layer in the DSM in FIG. 11.

For example, the obtaining M second prediction labels based on a feature output by M downsampling layers may be: respectively inputting the feature output by the M downsampling layers to M second FN layers for feature normalization processing, and respectively inputting a processing result to M output layers, to obtain the M second prediction labels.

The feature normalization processing used by the second FN layer may be the same as that used by the first FN layer.

For example, feature normalization processing may be: dividing an input feature by a square root of all the input features. For example, the result of the feature normalization processing may satisfy the following formula:

$$\hat{x}_i = \frac{x_i}{\sqrt{\sum_{i=1}^{m} x_i^2}},$$

where $x_i$ represents an $i^{th}$ input feature, m represents a quantity of input features, and $\hat{x}_i$ represents a result obtained by performing feature normalization on the $i^{th}$ input feature.

Further, the obtaining M second prediction labels based on a feature output by M downsampling layers may be: sequentially and respectively inputting the feature output by the M downsampling layers to M global pooling layers, M fully connected layers, M second FN layers, and M output layers, to obtain the M second prediction labels.

S2: Determine, based on the at least one second prediction label and a real label of training data, a function of a first loss function corresponding to the at least one second prediction label.

The function value of the first loss function corresponding to the at least one second prediction label indicates a difference between the at least one second prediction label and the real label of the training data.

For example, the first loss function may be a cross-entropy loss function. For descriptions of the first loss function, refer to operation S830. Details are not described herein again.

For example, a function value of the first loss function corresponding to the M second prediction labels may be determined based on the M second prediction labels.

For example, there are M dynamic stable modules. As shown in FIG. 11, each DSM is disposed after one downsampling layer, and the second target optimization module in the DSM may be configured to perform operation S2.

S3: Calculate at least one second weight gradient of the neural network model based on the function value of the first loss function corresponding to the at least one second prediction label.

For example, the at least one second weight gradient is calculated by back propagating the function value of the first loss function corresponding to the at least one second prediction label.

For example, M second weight gradients may be obtained through calculation based on the function value of the first loss function corresponding to the M second prediction labels.

For example, there are M dynamic stable modules. As shown in FIG. 11, each DSM is disposed after one downsampling layer, and the second target optimization module in the DSM may be configured to perform operation S3.

As described above, a function value of a second loss function corresponding to the at least one second prediction label indicates a sum of a difference between a candidate weight parameter and a weight parameter of the neural network model and a difference between a weight variation and the second weight gradient.

For descriptions of the second loss function, refer to the foregoing operation S850. Details are not described herein again.

A function value of a target loss function may be determined based on the function value of the second loss function corresponding to the first prediction label and the function value of the second loss function corresponding to the at least one second prediction label. As shown in FIG. 11, the second target optimization module collaborates with a first target optimization module to train the neural network model.

For example, the function value of the target loss function is a sum of the function value of the second loss function corresponding to the first prediction label and the function value of the second loss function corresponding to the at least one second prediction label.

For example, the function value of the target loss function may satisfy the following formula:

$$L_{all} = L_{new\_n} + L_{new}, \text{ where}$$

$L_{all}$ represents the function value of the target loss function, and $L_{new\_n}$ represents the function value of the second loss function corresponding to the second prediction label. If the second prediction label is obtained based on the feature output by the downsampling layer, $L_{new\_n}$ may also be understood as a function value of the second loss function corresponding to an $n^{th}$ downsampling layer.

For example, the function value $L_{all}$ of the target loss function may satisfy the following formula:

$$L_{all} = a_n * L_{new\_n} + L_{new}, \text{ where}$$

$a_n$ represents a weight of $L_{new\_n}$. If the second prediction label is obtained based on a feature output by a downsampling layer, $a_n$ may also be understood as a weight of a function value of the second loss function corresponding to an $n^{th}$ downsampling layer. For example, $a_n$ may be a preset fixed value. Alternatively, $a_n$ may be a change value, for example, changes with a quantity of iteration times. For descriptions, refer to Manner 1, Manner 2, Manner 3, Manner 4, and Manner 5 in the following.

When an initial weight of the neural network model is used for training, the neural network model is very likely to be unstable in an initial training phase.

According to the solution in an embodiment of the application, the second prediction label is obtained based on the feature output by the at least one layer in the neural network, to calculate, based on the second prediction label, the second weight gradient as an auxiliary reference for updating the parameter of the neural network model, so that gradient fluctuation can be reduced, and training stability can be improved.

In addition, because a resolution of a feature map after the downsampling layer is reduced, a large amount of information is lost. It is found through analysis that a gradient of the downsampling layer fluctuates greatly, and unstable training is caused. According to the solution in an embodiment of the application, the second prediction label is obtained based on the feature output by the downsampling layer, to calculate, based on the second prediction label, the second weight gradient as an auxiliary reference for updating the parameter of the neural network model, so that gradient fluctuation can be further reduced, and training stability can be improved.

In addition, only the second prediction label obtained based on the feature output by the downsampling layer is used for assisted training, a small calculation amount is added, and a large quantity of training resources are not occupied. That is, almost without increasing overheads, gradient fluctuation is further reduced, and training stability is improved.

In addition, by performing feature normalization processing, forward fluctuation is controlled within a range, so that the entire training process is more stable, and the training process can be further accelerated. Especially, compared with a neural network model using a BN module or the like, the neural network model using the BN module or the like usually needs a large quantity of BN modules, which occupies a large quantity of training overheads. The solution in an embodiment of the application can achieve a same convergence speed and inference precision as the neural network model using the BN module or the like. In addition, in the solution in an embodiment of the application, the FN layers are disposed only before the downsampling layer and a last output layer of the neural network model, a small quantity of FN layers are needed, and training overheads are far less than training overheads needed by the neural network model using the BN module or the like.

In an embodiment, in the initial training phase, the loss function value of the target loss function is determined based on the function value of the second loss function corresponding to the first prediction label and the function value of the second loss function corresponding to the at least one second prediction label.

In a later training phase, the loss function value of the target loss function is determined based on the function value of the second loss function corresponding to the first prediction label.

In other words, in the initial training phase, operation S810 to operation S860 and operation S1 to operation S3 are performed, and the training is assisted by using the second prediction label. In the later training phase, only operation S810 to operation S860 are performed, and the training is completed by using only the first prediction label.

For example, in the initial training phase, training is performed by using the neural network model shown in FIG. 11, and in the later training phase, the training is completed by using the neural network model shown in FIG. 10.

In this case, in the foregoing formula of the target loss function, an is greater than 0 in the initial training phase, and an is 0 in the later training phase.

In an embodiment of the application, a training manner is variable. For example, the method 800 is performed by the apparatus 700. In the initial training phase, the adjustment module 740 sends an enable signal to enable the DSM 730. For example, training is performed based on the neural network model in FIG. 11. In the later training phase, the adjustment module 740 sends a disable signal to disable the DSM 730. In other words, training is performed based on the neural network model shown in FIG. 10.

The training manners in different phases may be set based on a requirement. The following describes the training manners in different phases by using examples of fives manner (Manner 1, Manner 2, Manner 3, Manner 4, and Manner 5).

Manner 1: A weight that corresponds to the function value of the second loss function corresponding to the at least one second prediction label and that is in the function value of the target loss function is in a negative correlation with a quantity of update times.

In other words, a proportion of the function value of the second loss function corresponding to the at least one second prediction label to the function value of the target loss function continuously decreases with the training process.

For example, the weight value may change with the quantity of iteration times. In other words, the weight value is reduced after one iteration time is completed. For another example, the weight value may change with a quantity of epoch times. In other words, the weight value is reduced after one epoch time is completed. A change frequency of the weight is not limited in an embodiment of the application, provided that the weight is in a negative correlation with the quantity of update times.

As shown above, the function value $L_{all}$ of the target loss function may satisfy the following formula:

$$L_{all}=a_n*L_{new}n+L_{new}.$$

In this case, $a_n$ decreases with an increase in the quantity of update times. If $a_n$ decreases to 0, the function value of the target loss function is determined based on only the function value of the second loss function corresponding to the first prediction label. In other words, the initial training phase is a phase in which $a_n$ is not 0, and operation S1 to operation S3 are performed in this phase.

Manner 2: When a quantity of update times is less than or equal to a third threshold, the loss function value of the target loss function is determined based on the function value of the second loss function corresponding to the first prediction label and the function value of the second loss function corresponding to the at least one second prediction label.

Further, when the quantity of update times is greater than the third threshold, the loss function value of the target loss function is determined based on the function value of the second loss function corresponding to the first prediction label.

In other words, the initial training phase is a phase in which the quantity of update times is less than or equal to the third threshold, and operation S1 to operation S3 are performed in this phase.

In an embodiment of the application, the quantity of update times may also be understood as a quantity of iteration times.

In the foregoing formula of the target loss function, when the quantity of iteration times is greater than the third threshold, $a_n=0$; or when the quantity of iteration times is less than or equal to the third threshold, $a_n$ is greater than 0.

For example, when the quantity of iteration times is less than or equal to the third threshold, $a_n$ is a fixed value, or $a_n$ is in a negative correlation with the quantity of update times.

In other words, the DSM module in the apparatus 700 participates in the training only when the quantity of iteration times is less than or equal to the third threshold.

Manner 3: When a quantity of epoch times is less than or equal to T, the loss function value of the target loss function is determined based on the function value of the second loss function corresponding to the first prediction label and the function value of the second loss function corresponding to the at least one second prediction label. T is a positive integer.

Further, when the quantity of epoch times is greater than T, the loss function value of the target loss function is determined based on the function value of the second loss function corresponding to the first prediction label.

One epoch time means that all training samples in a training set are trained once. In the foregoing formula of the target loss function, when the quantity of epoch times is less than or equal to T, $a_n$ is greater than 0; or when the quantity of epoch times is greater than T, $a_n=0$.

For example, when the quantity of epoch times is less than or equal to T, an is a fixed value, or an is in a negative correlation with the quantity of update times.

Usually, an entire training periodicity lasts for dozens of epoch times, and the training process is assisted by using the second prediction label only in first T epoch times. A value of T is usually small, for example, 5 to 10 epoch times. In this way, a calculation amount can be further reduced, and overheads can be reduced.

In other words, all the DSMs in the apparatus 700 participate in the training only in the first T epoch times (for example, 5 to 10 epoch times).

For example, there are N downsampling layers in the neural network model, and the DSMs may be added after the N downsampling layers.

As shown in FIG. 11, from start of the training to a $T^{th}$ epoch time, the N DSMs and the first target optimization module synchronously train the neural network model. As shown in FIG. 10, from the $T^{th}$ epoch time to an end of the training, the first target optimization module trains the neural network model.

Manner 4: When a change value that is of the function value of the target loss function and that is obtained through Q consecutive iteration times is less than a fourth threshold, the function value of the target loss function is determined based on the second loss function value corresponding to the first prediction label. Q is a positive integer.

Further, when the change value that is of the function value of the target loss function and that is obtained through Q consecutive iteration times is greater than or equal to the fourth threshold, the loss function value of the target loss function is determined based on the function value of the second loss function corresponding to the first prediction label and the function value of the second loss function corresponding to the at least one second prediction label.

In other words, when the change value that is of the function value of the target loss function and that is obtained through Q consecutive iteration times is greater than or equal to the fourth threshold, operation S1 to operation S3 are performed, and the training is assisted by using the second prediction label. When the change value that is of the function value of the target loss function and that is obtained through Q consecutive iteration times is less than the fourth threshold, the neural network model is trained based on only the function value of the second loss function corresponding to the first prediction label.

In the foregoing formula of the target loss function, when the change value that is of the function value of the target loss function and that is obtained through Q consecutive iteration times is less than the fourth threshold, $a_n=0$; or when the change value that is of the function value of the target loss function and that is obtained through Q consecutive iteration times is greater than or equal to the fourth threshold, $a_n$ is greater than 0.

For example, when the change value that is of the function value of the target loss function and that is obtained through Q consecutive iteration times is greater than or equal to the fourth threshold, an is a fixed value, or an is in a negative correlation with a quantity of update times.

For example, the DSM module in the apparatus 700 participates in the training only when the change value that is of the function value of the target loss function and that is obtained through Q consecutive iteration times is greater than or equal to the fourth threshold.

Manner 5: When a change value that is of the function value of the second loss function corresponding to the first prediction label and that is obtained through Z consecutive iteration times is less than a fifth threshold, the loss function value of the target loss function is determined based on the function value of the second loss function corresponding to the first prediction label.

Further, when the change value that is of the function value of the second loss function corresponding to the first prediction label and that is obtained through Z consecutive iteration times is greater than or equal to the fifth threshold, the loss function value of the target loss function is determined based on the function value of the second loss function corresponding to the first prediction label and the function value of the second loss function corresponding to the at least one second prediction label.

In other words, when the change value that is of the function value of the second loss function corresponding to the first prediction label and that is obtained through Z consecutive iteration times is greater than or equal to the fifth threshold, operation S1 to operation S3 are performed, and the training is assisted by using the second prediction label. When the change value that is of the function value of the second loss function corresponding to the first prediction label and that is obtained through Z consecutive iteration times is less than the fifth threshold, the neural network model is trained based on only the function value of the second loss function corresponding to the first prediction label.

In the foregoing formula of the target loss function, when the change value that is of the function value of the second loss function corresponding to the first prediction label and that is obtained through Z consecutive iteration times is less than the fifth threshold, $a_n=0$; or when the change value that is of the function value of the second loss function corresponding to the first prediction label and that is obtained through Z consecutive iteration times is greater than or equal to the fifth threshold, $a_n$ is greater than 0.

For example, when the change value that is of the function value of the second loss function corresponding to the first prediction label and that is obtained through Z consecutive iteration times is greater than or equal to the fifth threshold, an is a fixed value, or $a_n$ is in a negative correlation with a quantity of update times.

For example, the DSM module in the apparatus 700 participates in the training only when the change value that is of the function value of the second loss function corresponding to the first prediction label and that is obtained through Z consecutive iteration times is greater than or equal to the fifth threshold.

Manner 4 and Manner 5 may be understood as follows: When a fluctuation value of the function value of the loss function is small, it may be considered that the later training phase is entered, and the training is completed by using only the function value of the second loss function corresponding to the first prediction label.

It should be understood that the foregoing division manner is merely an example. In an actual application process, the initial training phase and the later training phase may be obtained through division based on a requirement, or enabling the DSM or disabling the DSM may be determined based on the training process.

Further, enabling or disabling all the DSMs is only used as an example above for description. In an actual application process, some DSMs may be enabled or disabled based on a requirement. In other words, the second prediction labels may be obtained by using a feature output by some downsampling layers, to assist the training. For example, as the quantity of iteration times increases, a quantity of disabled DSMs gradually increases, until all the DSMs are disabled.

In the initial training phase, the function value of the loss function usually fluctuates greatly, in other words, the function value of the second loss function corresponding to the first prediction label changes greatly. In this case, the function value of the target loss function is determined based on the function value of the second loss function corresponding to the first prediction label and the function value of the second loss function corresponding to the at least one second prediction label. That is, the training process is assisted by using the second prediction label, to improve stability of the neural network model in the initial training phase. In the later training phase, the function value of the loss function tends to be stable, in other words, the function value of the second loss function corresponding to the first prediction label changes slightly. The neural network model may be trained based on only the function value of the second loss function corresponding to the first prediction label.

According to the solution in an embodiment of the application, the training process is assisted by using the second prediction label only in the initial training phase. In this way, the stability of the neural network model in the initial training phase can be improved, a calculation amount is further reduced, and training overheads are reduced. For example, when the function value of the target loss function fluctuates greatly, the DSM 730 in the apparatus 700 is enabled. When the function value of the target loss function fluctuates slightly, or the function value of the target loss function is stable, the DSM 730 in the apparatus 700 is disabled. The DSM is used only in the initial training phase, but is discarded in the later training phase. In this way, almost no training overheads are increased while the training stability can be ensured.

In addition, according to the solution in an embodiment of the application, the training manner is adaptively adjusted. For example, in Manner 3 and Manner 4, the training manner is adjusted based on a change status of the function value of the loss function in the training process, a calculation capability of a processor is fully used, and the training stability of the neural network model can be improved when almost no implementation difficulty and training overheads are increased.

In an embodiment, the solution in an embodiment of the application may be used to optimize a training process of an original neural network model. The first loss function may be an original loss function of the neural network model. As described above, the target optimization module 720 may be understood as a target optimization layer after an output layer of the neural network module. In a training process of an original neural network model, the target optimization layer updates the weight parameter of the neural network model based on the function value of the first loss function. In the training process of the method 800, the target optimization layer updates the weight parameter of the neural network model based on the function value of the target loss function. If the original neural network model includes a BN layer, the BN layer may be deleted. Further, the DSM module is added after a downsampling layer of the original neural network model, to assist the training of the neural network model. In other words, without changing a structure of the neural network model, the target optimization layer in the training process of the original neural network model may be replaced with the target optimization layer in an embodiment of the application, the DSM is added, and the DSM is enabled or disabled in the training process to adjust the training manner. That is, training can be performed by using the solution in an embodiment of the application.

Figure 12:
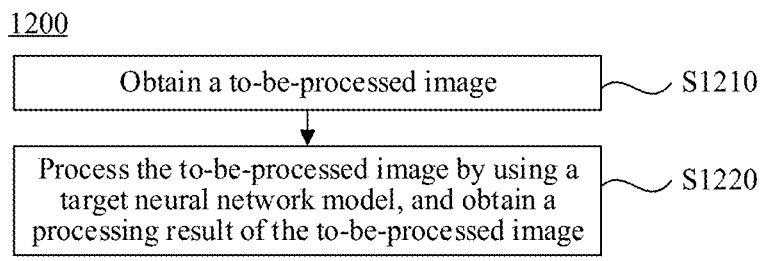
FIG. 12 is a schematic flowchart of an image processing method according to an embodiment of this application.

FIG. 12 is a schematic flowchart of an image processing method 1200 according to an embodiment of this application. The method may be performed by an apparatus or a device that can perform image processing. For example, the apparatus may be a cloud service device, or may be a terminal device, for example, an apparatus such as a computer or a server that has an operation capability sufficient to perform the image processing method, or may be a system including the cloud service device and the terminal device. For example, the method 1200 may be performed by the execution device 110 in FIG. 2, the neural-network processing unit 50 in FIG. 5, the execution device 310 in FIG. 6, or a local device.

For example, the method 1200 may be performed by the execution device 110 shown in FIG. 2, and a to-be-processed image in the method 1200 may be input data provided by the client device 140 shown in FIG. 2.

A target neural network model used in the image processing method 1200 in FIG. 12 may be constructed by using the method in FIG. 8. The method 1200 includes operation S1210 to operation S1220. For an embodiment of the method 1200, refer to the foregoing method 800. To avoid unnecessary repetition, repeated descriptions are properly omitted when the method 1200 is described below.

S1210: Obtain a to-be-processed image.

The to-be-processed image may be an image photographed by a terminal device (or another apparatus or device such as a computer or a server) by using a camera, or the to-be-processed image may be an image obtained from a terminal device (or another apparatus or device such as a computer or a server) (for example, an image stored in an album of the terminal device, or an image obtained by the terminal device from a cloud). This is not limited in an embodiment of the application.

S1220: Perform feature extraction on the to-be-processed image by using a target neural network model, and obtain a processing result of the to-be-processed image based on a feature extracted by the target neural network model.

The target neural network model performs feature extraction by inputting training data to the neural network model; obtains a first prediction label based on the feature extracted by the neural network model; determines, based on the first prediction label and a real label of the training data, a function value of a first loss function corresponding to the first prediction label, where the function value of the first loss function corresponding to the first prediction label indicates a difference between the first prediction label and the real label of the training data; calculates a first weight gradient of the neural network model based on the function value of the first loss function corresponding to the first prediction label; obtains a candidate weight parameter, where a partial derivative of a function value of a target loss function to the candidate weight parameter is 0; and updates a parameter of the neural network model based on the candidate weight parameter, where the function value of the target loss function is determined based on a function value of a second loss function corresponding to the first prediction label, the function value of the second loss function corresponding to the first prediction label indicates a difference between the candidate weight parameter and a weight parameter of the neural network model and a difference between a weight variation and the first weight gradient, and the weight variation is a difference between the candidate weight parameter and the weight parameter of the neural network model.

In an embodiment, the function value of the target loss function is determined based on the function value of the second loss function corresponding to the first prediction label and a function value of the second loss function corresponding to at least one second prediction label, the function value of the second loss function corresponding to the at least one second prediction label indicates a difference between the candidate weight parameter and the weight parameter of the neural network model and a difference between the weight variation and a second weight gradient, the at least one second prediction label is obtained based on a feature output by at least one downsampling layer in the neural network model, the function value of the second loss function corresponding to the at least one second prediction label is determined based on the at least one second prediction label and the real label of the training data, a function value of the first loss function corresponding to the at least one second prediction label indicates a difference between the at least one second prediction label and the real label of the training data, and the at least one second weight gradient is obtained through calculation based on the function value of the first loss function corresponding to the at least one second prediction label.

In an embodiment, that the function value of the target loss function is determined based on the function value of the second loss function corresponding to the first prediction label and a function value of the second loss function corresponding to the at least one second prediction label includes: a weight that corresponds to the function value of the second loss function corresponding to the at least one second prediction label and that is in the function value of the target loss function is in a negative correlation with a quantity of update times of the neural network model.

In an embodiment, the target neural network model includes a first feature normalization layer, and the first feature normalization layer is located before an output layer of the target neural network model, and is used to perform feature normalization processing on a feature input to the first feature normalization layer.

In an embodiment, the neural network model includes at least one second feature normalization layer, the at least one second feature normalization layer is respectively located after the at least one downsampling layer, and is used to perform feature normalization processing on a feature input to the at least one second feature normalization layer, a feature output by the at least one downsampling layer in the neural network model is respectively input to the at least one second feature normalization layer for feature normalization processing, and the at least one second prediction label is obtained based on a processing result.

In an embodiment, the second loss function satisfies the following formula:

$$L_{new}=\lambda_1 * d_1(w-w_k, \nabla_w^L) + \lambda_2 * d_2(w, w_k), \text{ where}$$

$L_{new}$ represents the second loss function, w represents the candidate weight parameter, and $w_k$ represents the weight parameter of the neural network model; and $\nabla_w^L$ represents a weight gradient of the neural network model, $d_1$ represents a function indicating a difference between the weight variation and the weight gradient, $d_2$ represents a function indicating the difference between the candidate weight parameter and the weight parameter of the neural network model, $\lambda_1$ represents a weight of $d_1$, and $\lambda_2$ represents a weight of $d_2$.

In an embodiment, the updating the parameter of the neural network model based on the candidate weight parameter includes: updating the parameter of the neural network model based on the candidate weight parameter and a learning rate, where the learning rate indicates a change amplitude of the weight parameter of the neural network model.

In an embodiment, the updated weight parameter of the neural network model satisfies the following formula:

$$w_{k+1} = (w - w_k) * lr + w_k, \text{ where}$$

$w_{k+1}$ represents the updated weight parameter of the neural network model, $w_k$ represents the weight parameter of the neural network model, w represents the candidate weight parameter, and lr represents the learning rate.

Apparatuses in embodiments of this application are described below with reference to FIG. 13 to FIG. 16. It should be understood that the apparatus described below can perform the methods in the foregoing embodiments of this application. To avoid unnecessary repetition, repeated descriptions are properly omitted when the apparatuses in embodiments of this application are described below.

Figure 13:
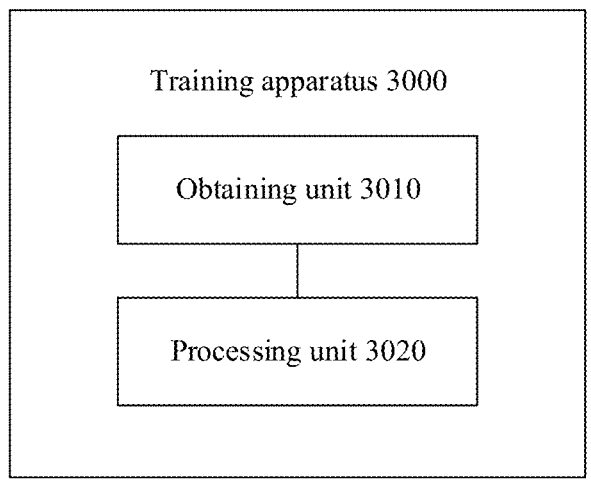
FIG. 13 is a schematic block diagram of a neural network model training apparatus according to an embodiment of this application.

FIG. 13 is a schematic block diagram of a recommendation model training apparatus according to an embodiment of this application. The recommendation model training apparatus 3000 shown in FIG. 13 includes an obtaining unit 3010 and a processing unit 3020.

The obtaining unit 3010 and the processing unit 3020 may be configured to perform a recommendation model training method in embodiments of this application, may be configured to perform the method 800.

The obtaining unit 3010 is configured to obtain training data.

The processing unit 3020 is configured to: input the training data to a neural network model for feature extraction, and obtain a first prediction label based on an extracted feature; determine, based on the first prediction label and a real label of the training data, a function value of a first loss function corresponding to the first prediction label, where the function value of the first loss function corresponding to the first prediction label indicates a difference between the first prediction label and the real label of the training data; calculate a first weight gradient of the neural network model based on the function value of the first loss function corresponding to the first prediction label; obtain a candidate weight parameter, where a partial derivative of a function value of a target loss function to the candidate weight parameter is 0, the function value of the target loss function is determined based on a function value of a second loss function corresponding to the first prediction label, the function value of the second loss function corresponding to the first prediction label indicates a difference between the candidate weight parameter and a weight parameter of the neural network model and a difference between a weight variation and the first weight gradient, and the weight variation is a difference between the candidate weight parameter and the weight parameter of the neural network model; and update the parameter of the neural network model based on the candidate weight parameter.

For example, in an embodiment, the processing unit 3020 is further configured to: obtain at least one second prediction label based on a feature output by at least one downsampling layer in the neural network model; determine, based on the at least one second prediction label and the real label of the training data, a function value of a first loss function corresponding to the at least one second prediction label, where the function value of the first loss function corresponding to the at least one second prediction label indicates a difference between the at least one second prediction label and the real label of the training data; and calculate at least one second weight gradient of the neural network model based on the function value of the first loss function corresponding to the at least one second prediction label, where the function value of the target loss function is determined based on the function value of the second loss function corresponding to the first prediction label and a function value of the second loss function corresponding to the at least one second prediction label, and the function value of the second loss function corresponding to the at least one second prediction label indicates a difference between the candidate weight parameter and the weight parameter of the neural network model and a difference between the weight variation and the second weight gradient.

For example, in an embodiment, that the function value of the target loss function is determined based on the function value of the second loss function corresponding to the first prediction label and a function value of the second loss function corresponding to the at least one second prediction label includes: a weight that corresponds to the function value of the second loss function corresponding to the at least one second prediction label and that is in the function value of the target loss function is in a negative correlation with a quantity of update times of the neural network model.

For example, in an embodiment, the neural network model includes a first feature normalization layer, and the first feature normalization layer is located before an output layer of the neural network model, and is used to perform feature normalization processing on a feature input to the first feature normalization layer.

For example, in an embodiment, the neural network model includes at least one second feature normalization layer, and the at least one second feature normalization layer is respectively located after the at least one downsampling layer, and is used to perform feature normalization processing on a feature input to the at least one second feature normalization layer; and the processing unit 3020 is further configured to: respectively input a feature output by the at least one downsampling layer in the neural network model to the at least one second feature normalization layer for feature normalization processing, and obtain the at least one second prediction label based on a processing result.

For example, in an embodiment, the second loss function satisfies the following formula:

$$L_{new}=\lambda_1 * d_1(w-w_k, \nabla_w^L) + \lambda_2 * d_2(w, w_k), \text{ where}$$

$L_{new}$ represents the second loss function, w represents the candidate weight parameter, and $w_k$ represents the weight parameter of the neural network model; and $\nabla_w^L$ represents a weight gradient of the neural network model, $d_1$ represents a function indicating a difference between the weight variation and the weight gradient, $d_2$ represents a function indicating the difference between the candidate weight parameter and the weight parameter of the neural network model, $\lambda_1$ represents a weight of $d_1$, and $\lambda_2$ represents a weight of $d_2$.

For example, in an embodiment, the processing unit 3020 is specifically configured to: update the parameter of the neural network model based on the candidate weight parameter and a learning rate, where the learning rate indicates a change amplitude of the weight parameter of the neural network model.

For example, in an embodiment, the updated weight parameter of the neural network model satisfies the following formula:

$$w_{k+1}=(w-w_k)*lr+w_k, \text{ where}$$

$w_{k+1}$ represents the updated weight parameter of the neural network model, $w_k$ represents the weight parameter of the neural network model, w represents the candidate weight parameter, and lr represents the learning rate.

Figure 14:
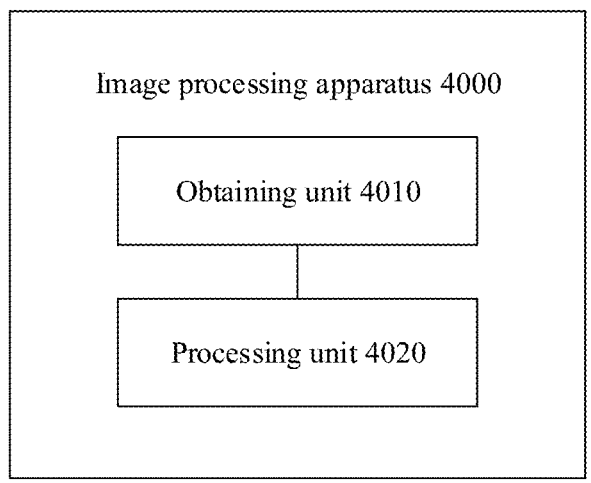
FIG. 14 is a schematic block diagram of an image processing apparatus according to an embodiment of this application.

FIG. 14 is a schematic block diagram of an image processing apparatus 4000 according to an embodiment of this application. The image processing apparatus 4000 shown in FIG. 14 includes an obtaining unit 4010 and a processing unit 4020.

The obtaining unit 4010 and the processing unit 4020 may be configured to perform the image processing method in embodiments of this application, for example, may be configured to perform the method 1200.

The obtaining unit 4010 is configured to obtain a to-be-processed image.

The processing unit 4020 is configured to perform feature extraction on the to-be-processed image by using a target neural network model, and obtain a processing result of the to-be-processed image based on a feature extracted by the target neural network model.

The target neural network model performs feature extraction by inputting training data to the neural network model; obtains a first prediction label based on the feature extracted by the neural network model; determines, based on the first prediction label and a real label of the training data, a function value of a first loss function corresponding to the first prediction label, where the function value of the first loss function corresponding to the first prediction label indicates a difference between the first prediction label and the real label of the training data; calculates a first weight gradient of the neural network model based on the function value of the first loss function corresponding to the first prediction label; obtains a candidate weight parameter, where a partial derivative of a function value of a target loss function to the candidate weight parameter is 0; and updates a parameter of the neural network model based on the candidate weight parameter, where the function value of the target loss function is determined based on a function value of a second loss function corresponding to the first prediction label, the function value of the second loss function corresponding to the first prediction label indicates a difference between the candidate weight parameter and a weight parameter of the neural network model and a difference between a weight variation and the first weight gradient, and the weight variation is a difference between the candidate weight parameter and the weight parameter of the neural network model.

Optionally, in an embodiment, the function value of the target loss function is determined based on the function value of the second loss function corresponding to the first prediction label and a function value of the second loss function corresponding to at least one second prediction label, the function value of the second loss function corresponding to the at least one second prediction label indicates a difference between the candidate weight parameter and the weight parameter of the neural network model and a difference between the weight variation and a second weight gradient, the at least one second prediction label is obtained based on a feature output by at least one downsampling layer in the neural network model, the function value of the second loss function corresponding to the at least one second prediction label is determined based on the at least one second prediction label and the real label of the training data, a function value of the first loss function corresponding to the at least one second prediction label indicates a difference between the at least one second prediction label and the real label of the training data, and the at least one second weight gradient is obtained through calculation based on the function value of the first loss function corresponding to the at least one second prediction label.

For example, in an embodiment, that the function value of the target loss function is determined based on the function value of the second loss function corresponding to the first prediction label and a function value of the second loss function corresponding to the at least one second prediction label includes: a weight that corresponds to the function value of the second loss function corresponding to the at least one second prediction label and that is in the function value of the target loss function is in a negative correlation with a quantity of update times of the neural network model.

For example, in an embodiment, the target neural network model includes a first feature normalization layer, and the first feature normalization layer is located before an output layer of the target neural network model, and is used to perform feature normalization processing on a feature input to the first feature normalization layer.

For example, in an embodiment, the neural network model includes at least one second feature normalization layer, the at least one second feature normalization layer is respectively located after the at least one downsampling layer, and is used to perform feature normalization processing on a feature input to the at least one second feature normalization layer, a feature output by the at least one downsampling layer in the neural network model is respectively input to the at least one second feature normalization layer for feature normalization processing, and the at least one second prediction label is obtained based on a processing result.

For example, in an embodiment, the second loss function satisfies the following formula:

$$L_{new}=\lambda_1 * d_1(w-w_k, \nabla_w^L) + \lambda_2 * d_2(w, w_k), \text{ where}$$

$L_{new}$ represents the second loss function, w represents the candidate weight parameter, and $w_k$ represents the weight parameter of the neural network model; and $\nabla_w^L$ represents a weight gradient of the neural network model, $d_1$ represents a function indicating a difference between the weight variation and the weight gradient, $d_2$ represents a function indicating the difference between the candidate weight parameter and the weight parameter of the neural network model, $\lambda_1$ represents a weight of $d_1$, and $\lambda_2$ represents a weight of $d_2$.

For example, in an embodiment, the updating the parameter of the neural network model based on the candidate weight parameter includes: updating the parameter of the neural network model based on the candidate weight parameter and a learning rate, where the learning rate indicates a change amplitude of the weight parameter of the neural network model.

For example, in an embodiment, the updated weight parameter of the neural network model satisfies the following formula:

$$w_{k+1}=(w-w_k)*lr+w_k, \text{ where}$$

$w_{k+1}$ represents the updated weight parameter of the neural network model, $w_k$ represents the weight parameter of the neural network model, w represents the candidate weight parameter, and lr represents the learning rate.

It should be noted that the training apparatus 3000 and the apparatus 4000 are embodied in a form of functional units. The term "unit" herein may be implemented in a form of software and/or hardware. This is not specifically limited.

For example, the "unit" may be a software program, a hardware circuit, or a combination thereof for implementing the foregoing function. The hardware circuit may include an application-specific integrated circuit (ASIC), an electronic circuit, a processor (for example, a shared processor, a dedicated processor, or a group processor) configured to execute one or more software or firmware programs and a memory, a combined logic circuit, and/or other suitable components that support the described functions.

Therefore, the units in the examples described in an embodiment of the application can be implemented by using electronic hardware, or a combination of computer software and electronic hardware. Whether the functions are performed by hardware or software depends on particular applications and design constraint conditions of the technical solutions. One of ordinary skilled in the art may use different methods to implement the described functions for each particular application, but it should not be considered that the implementation goes beyond the scope of this application.

Figure 15:
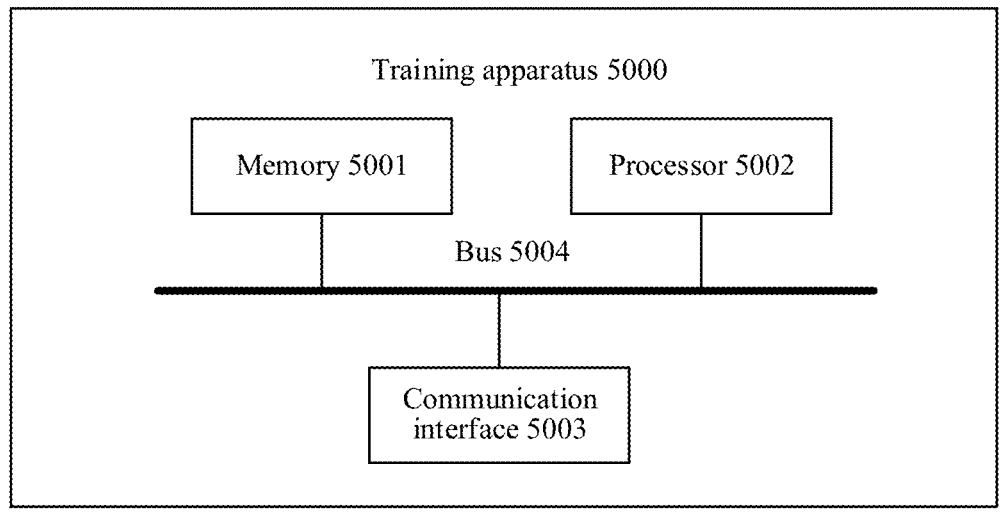
FIG. 15 is a schematic block diagram of a neural network model training apparatus according to an embodiment of this application.

FIG. 15 is a schematic diagram of a hardware structure of a neural network model training apparatus according to an embodiment of this application. The neural network model training apparatus 5000 shown in FIG. 15 (the apparatus 5000 may be a computer device) includes a memory 5001, a processor 5002, a communication interface 5003, and a bus 5004. Communication connections between the memory 5001, the processor 5002, and the communication interface 5003 are implemented through the bus 5004.

The memory 5001 may be a read only memory (ROM), a static storage device, a dynamic storage device, or a random access memory (RAM). The memory 5001 may store a program. When the program stored in the memory 5001 is executed by the processor 5002, the processor 5002 is configured to perform operations in the neural network model training method in embodiments of this application. For example, the processor 5002 may perform operation S810 to operation S860 in the method shown in FIG. 8.

The processor 5002 may be a general-purpose central processing unit (CPU), a microprocessor, an application-specific integrated circuit (ASIC), a graphics processing unit (GPU), or one or more integrated circuits, and is configured to execute a related program, to implement the neural network model training method in the method embodiments of this application.

Alternatively, the processor 5002 may be an integrated circuit chip and has a signal processing capability. For example, the processor 5002 may be the chip shown in FIG. 5. In an embodiment, the operations in the neural network model training method in this application may be completed by using a hardware integrated logic circuit in the processor 5002 or instructions in a form of software.

The processor 5002 may alternatively be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the operations, and logical block diagrams that are disclosed in embodiments of this application. The general-purpose processor may be a microprocessor, or the processor may be any conventional processor, or the like. The operations in the methods disclosed with reference to embodiments of this application may be directly performed and completed by using a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 5001. The processor 5002 reads information in the memory 5001, and completes, in combination with hardware of the processor 5002, functions that need to be executed by the units included in the training apparatus shown in FIG. 13, or performs the neural network model training method shown in FIG. 8 in the method embodiments of this application.

The communication interface 5003 uses a transceiver apparatus, for example, but not limited to, a transceiver, to implement communication between the apparatus 5000 and another device or a communication network. For example, training data may be obtained through the communication interface 5003.

The bus 5004 may include a path for transmitting information between various components (for example, the memory 5001, the processor 5002, and the communication interface 5003) of the apparatus 5000.

Figure 16:
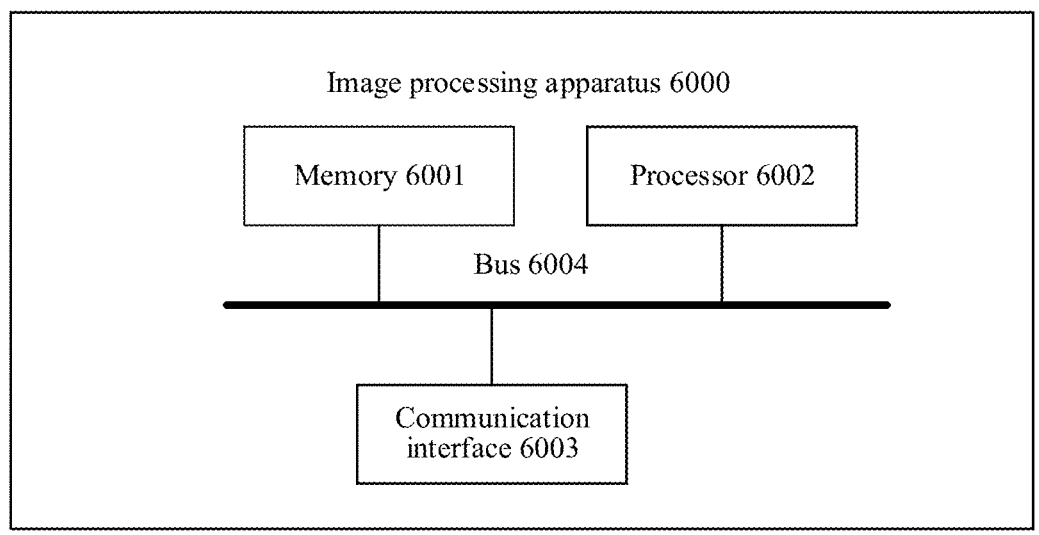
FIG. 16 is a schematic block diagram of an image processing apparatus according to an embodiment of this application.

FIG. 16 is a schematic diagram of a hardware structure of an image processing apparatus according to an embodiment of this application. The image processing apparatus 6000 shown in FIG. 16 includes a memory 6001, a processor 6002, a communication interface 6003, and a bus 6004. Communication connections between the memory 6001, the processor 6002, and the communication interface 6003 are implemented through the bus 6004.

The memory 6001 may be a ROM, a static storage device, or a RAM. The memory 6001 may store a program. When the program stored in the memory 6001 is executed by the processor 6002, the processor 6002 and the communication interface 6003 are configured to perform operations in the image processing method in embodiments of this application. For example, the processor 6002 may perform operation S1210 to operation S1220 in the method shown in FIG. 12.

The processor 6002 may be a general-purpose CPU, a microprocessor, an ASIC, a GPU, or one or more integrated circuits, and is configured to execute a related program, to implement functions that need to be executed by units in the image processing apparatus in embodiments of this application, or perform the image processing method in the method embodiments of this application.

Alternatively, the processor 6002 may be an integrated circuit chip and has a signal processing capability. For example, the processor 6002 may be the chip shown in FIG. 5. In an embodiment, the operations in the image processing method in embodiments of this application may be completed by using a hardware integrated logic circuit in the processor 6002 or instructions in a form of software.

The processor 6002 may alternatively be a general-purpose processor, a DSP, an ASIC, an FPGA or another programmable logic device, a discrete gate or transistor logic device, or a discrete hardware component. The processor may implement or perform the methods, the operations, and logical block diagrams that are disclosed in embodiments of this application. The general-purpose processor may be a microprocessor, or the processor may be any conventional processor, or the like. The operations in the methods disclosed with reference to embodiments of this application may be directly performed and completed by using a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 6001. The processor 6002 reads information in the memory 6001, and completes, in combination with hardware of the processor 6002, functions that need to be executed by the units included in the image processing apparatus in embodiments of this application, or performs the image processing method in the method embodiments of this application.

The communication interface 6003 uses a transceiver apparatus, for example, but not limited to, a transceiver, to implement communication between the apparatus 6000 and another device or a communication network. For example, a to-be-processed image may be obtained through the communication interface 6003.

The bus 6004 may include a path for transmitting information between various components (for example, the memory 6001, the processor 6002, and the communication interface 6003) of the apparatus 6000.

It should be noted that, although only the memory, the processor, and the communication interface are shown in each of the apparatus 5000 and the apparatus 6000, during implementation, one of ordinary skilled in the art should understand that the apparatus 5000 and the apparatus 6000 each may further include another device necessary for normal running. In addition, according to a requirement, one of ordinary skilled in the art should understand that the apparatus 5000 and the apparatus 6000 may further include hardware devices for implementing other additional functions. In addition, one of ordinary skilled in the art should understand that the apparatus 5000 and the apparatus 6000 each may include only devices necessary for implementing embodiments of this application, but not necessarily include all the devices shown in FIG. 15 and FIG. 16.

It should be understood that, the processor in an embodiment of the application may be a central processing unit (CPU). The processor may be further another general-purpose processor, a digital signal processor (DSP), an application-specific integrated circuit (ASIC), a field programmable gate array (FPGA), or another programmable logic device, discrete gate or transistor logic device, discrete hardware device, or the like. The general-purpose processor may be a microprocessor, or the processor may be any conventional processor, or the like.

It may further be understood that the memory in an embodiment of the application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example, and not limitation, many forms of random access memories (RAMs) are available, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented using software, hardware, firmware, or any combination thereof. When software is used to implement embodiments, the foregoing embodiments may be implemented completely or partially in a form of a computer program product. The computer program product includes one or more computer instructions or computer programs. When the computer instructions or the computer programs are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium that can be accessed by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects, and represents that three relationships may exist. For example, A and/or B may represent the following three cases: Only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this application, "at least one" refers to one or more, and "a plurality of" refers to two or more. "At least one of the following items (pieces)" or a similar expression thereof indicates any combination of these items, including a single item (piece) or any combination of a plurality of items (pieces). For example, at least one item (piece) of a, b, or c may indicate: a, b, c, a-b, a-c, b-c, or a-b-c, where a, b, and c may be singular or plural.

It should be understood that in embodiments of this application, sequence numbers of the foregoing processes do not mean an execution sequence. An execution sequence of the processes should be determined based on functions and internal logic of the processes, and should not constitute any limitation on the implementation processes of embodiments of this application.

One of ordinary skilled in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. One of ordinary skilled in the art may use different methods to implement the described functions for each particular application, but it should not be considered that the implementation goes beyond the scope of this application.

It may be clearly understood by one of ordinary skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, for example, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, a network device, or the like) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement readily figured out by one of ordinary skilled in the art within the technical scope disclosed in this application shall fall within the protection scope of this application. Therefore, the protection scope of this application shall be subject to the protection scope of the claims.

What is claimed is:

1. A neural network model training device, comprising:
a processor; and
a memory coupled to the processor to store instructions, and when executed by the processor, cause the device to perform operations, the operations comprising:
obtaining training data;
inputting the training data to a neural network model for feature extraction, and obtaining a first prediction label based on an extracted feature;
determining, based on the first prediction label and a real label of the training data, a function value of a first loss function corresponding to the first prediction label indicating a difference between the first prediction label and the real label of the training data;
calculating a first weight gradient of the neural network model based on the function value of the first loss function corresponding to the first prediction label;
obtaining a candidate weight parameter, wherein a partial derivative of a function value of a target loss function to the candidate weight parameter is 0, the function value of the target loss function is determined based on a function value of a second loss function corresponding to the first prediction label indicating a difference between the candidate weight parameter and a weight parameter of the neural network model and a difference between a weight variation and the first weight gradient, and wherein the weight variation is a difference between the candidate weight parameter and the weight parameter of the neural network model; and
updating a parameter of the neural network model based on the candidate weight parameter.

2. The device according to claim 1, wherein the operations further comprise:
obtaining at least one second prediction label based on a feature output by at least one downsampling layer in the neural network model;
determining, based on the at least one second prediction label and the real label of the training data, a function value of a first loss function corresponding to the at least one second prediction label indicating a difference between the at least one second prediction label and the real label of the training data; and
calculating at least one second weight gradient of the neural network model based on the function value of the first loss function corresponding to the at least one second prediction label, wherein
the function value of the target loss function is determined based on the function value of the second loss function corresponding to the first prediction label and a function value of the second loss function corresponding to the at least one second prediction label indicating the difference between the candidate weight parameter and the weight parameter of the neural network model, and a difference between the weight variation and the second weight gradient.

3. The device according to claim 2, wherein the neural network model comprises:
at least one second feature normalization layer respectively located after the at least one downsampling layer used to perform feature normalization processing on a feature input to the at least one second feature normalization layer; and
the obtaining at least one second prediction label based on a feature output by the at least one downsampling layer in the neural network model comprises:
respectively inputting the feature output by the at least one downsampling layer in the neural network model to the at least one second feature normalization layer for feature normalization processing, and
obtaining the at least one second prediction label based on a processing result.

4. The device according to claim 1, wherein that the function value of the target loss function is determined based on the function value of the second loss function corresponding to the first prediction label and a function value of the second loss function corresponding to the at least one second prediction label comprises:
a weight that corresponds to the function value of the second loss function corresponding to the at least one second prediction label and that is in the function value of the target loss function is in a negative correlation with a quantity of update times of the neural network model.

5. The device according to claim 1, wherein the neural network model comprises:
a first feature normalization layer located before an output layer of the neural network model used to perform feature normalization processing on a feature input to the first feature normalization layer.

6. The device according to claim 1, wherein the second loss function satisfies the following formula:

$$L_{new} = \lambda_1 * d_1(w - w_k, \nabla_w^L) + \lambda_2 * d_2(w, w_k), \text{ wherein}$$

$L_{new}$ represents the second loss function, $w$ represents the candidate weight parameter, and $w_k$ represents the weight parameter of the neural network model; and $\nabla_w^L$ represents a weight gradient of the neural network model, $d_1$ represents a function indicating a difference between the weight variation and the weight gradient, $d_2$ represents a function indicating the difference between the candidate weight parameter and the weight parameter of the neural network model, $\lambda_1$ represents a weight of $d_1$, and $\lambda_2$ represents a weight of $d_2$.

7. The device according to claim 1, wherein the updating the parameter of the neural network model based on the candidate weight parameter comprises:
updating the parameter of the neural network model based on the candidate weight parameter and a learning rate indicating a change amplitude of the weight parameter of the neural network model.

8. The device according to claim 7, wherein the updated weight parameter of the neural network model satisfies the following formula:

$$w_{k+1} = (w - w_k) * lr + w_k, \text{ wherein}$$

$w_{k+1}$ represents the updated weight parameter of the neural network model, $w_k$ represents the weight parameter of the neural network model, w represents the candidate weight parameter, and lr represents the learning rate.

9. An image processing device, comprising a processor; and
a memory coupled to the processor to store instructions, which when executed by the processor, cause the device to perform operations, the operations comprising:
obtaining an image; and
performing feature extraction on the image by using a target neural network model, and obtaining a processing result of the image based on a feature extracted by the target neural network model, wherein
the target neural network model performs feature extraction by inputting training data to the neural network model; obtains a first prediction label based on the feature extracted by the neural network model; determines, based on the first prediction label and a real label of the training data, a function value of a first loss function corresponding to the first prediction label indicating a difference between the first prediction label and the real label of the training data; calculates a first weight gradient of the neural network model based on the function value of the first loss function corresponding to the first prediction label; obtains a candidate weight parameter, wherein a partial derivative of a function value of a target loss function to the candidate weight parameter is 0; and updates a parameter of the neural network model based on the candidate weight parameter, wherein the function value of the target loss function is determined based on a function value of a second loss function corresponding to the first prediction label indicating a difference between the candidate weight parameter and a weight parameter of the neural network model and a difference between a weight variation and the first weight gradient, and the weight variation is a difference between the candidate weight parameter and the weight parameter of the neural network model.

10. The device according to claim 9, wherein the function value of the target loss function is determined based on the function value of the second loss function corresponding to the first prediction label and a function value of the second loss function corresponding to at least one second prediction label indicating the difference between the candidate weight parameter and the weight parameter of the neural network model and a difference between the weight variation and a second weight gradient, the at least one second prediction label is obtained based on a feature output by at least one downsampling layer in the neural network model, the function value of the second loss function corresponding to the at least one second prediction label is determined based on the at least one second prediction label and the real label of the training data, a function value of the first loss function corresponding to the at least one second prediction label indicates a difference between the at least one second prediction label and the real label of the training data, and the at least one second weight gradient is obtained through calculation based on the function value of the first loss function corresponding to the at least one second prediction label.

11. The device according to claim 10, wherein the neural network model comprises at least one second feature normalization layer respectively located after the at least one downsampling layer used to perform feature normalization processing on a feature input to the at least one second feature normalization layer, and a feature output by the at least one downsampling layer in the neural network model is respectively input to the at least one second feature normalization layer for feature normalization processing, to obtain the at least one second prediction label based on a processing result.

12. The device according to claim 9, wherein that the function value of the target loss function is determined based on the function value of the second loss function corresponding to the first prediction label and a function value of the second loss function corresponding to the at least one second prediction label comprises:
a weight that corresponds to the function value of the second loss function corresponding to the at least one second prediction label and that is in the function value of the target loss function is in a negative correlation with a quantity of update times of the neural network model.

13. The device according to claim 9, wherein the target neural network model comprises:
a first feature normalization layer located before an output layer of the target neural network model used to perform feature normalization processing on a feature input to the first feature normalization layer.

14. The device according to claim 9, wherein the second loss function satisfies the following formula:

$L_{new} = \lambda_1 * d_1(w - w_k, \nabla_w^L) + \lambda_2 * d_2(w, w_k)$, wherein $L_{new}$ represents the second loss function, w represents the candidate weight parameter, and $w_k$ represents the weight parameter of the neural network model; and $\nabla_w^L$ represents a weight gradient of the neural network model, $d_1$ represents a function indicating a difference between the weight variation and the weight gradient, $d_2$ represents a function indicating the difference between the candidate weight parameter and the weight parameter of the neural network model, $\lambda_1$ represents a weight of $d_1$, and $\lambda_2$ represents a weight of $d_2$.

15. The device according to claim 9, wherein the updating the parameter of the neural network model based on the candidate weight parameter comprises:
updating the parameter of the neural network model based on the candidate weight parameter and a learning rate indicating a change amplitude of the weight parameter of the neural network model.

16. The device according to claim 15, wherein the updated weight parameter of the neural network model satisfies the following formula:

$w_{k+1} = (w - w_k) * lr + w_k$, wherein $w_{k+1}$ represents the updated weight parameter of the neural network model, $w_k$ represents the weight parameter of the neural network model, w represents the candidate weight parameter, and lr represents the learning rate.

17. An image processing method, comprising:
obtaining an image; and
performing feature extraction on the image by using a target neural network model, and obtaining a processing result of the image based on a feature extracted by the target neural network model, wherein
the target neural network model performs feature extraction by inputting training data to the neural network model; obtains a first prediction label based on the feature extracted by the neural network model; determines, based on the first prediction label and a real label of the training data, a function value of a first loss function corresponding to the first prediction label indicating a difference between the first prediction label and the real label of the training data; calculates a first weight gradient of the neural network model based on the function value of the first loss function corresponding to the first prediction label; obtains a candidate weight parameter, wherein a partial derivative of a function value of a target loss function to the candidate weight parameter is 0; and updates a parameter of the neural network model based on the candidate weight parameter, wherein the function value of the target loss function is determined based on a function value of a second loss function corresponding to the first prediction label indicating a difference between the candidate weight parameter and a weight parameter of the neural network model and a difference between a weight variation and the first weight gradient, and the weight variation is a difference between the candidate weight parameter and the weight parameter of the neural network model.

18. The method according to claim 17, wherein the function value of the target loss function is determined based on the function value of the second loss function corresponding to the first prediction label and a function value of the second loss function corresponding to at least one second prediction label indicating the difference between the candidate weight parameter and the weight parameter of the neural network model and a difference between the weight variation and a second weight gradient, the at least one second prediction label is obtained based on a feature output by at least one downsampling layer in the neural network model, the function value of the second loss function corresponding to the at least one second prediction label is determined based on the at least one second prediction label and the real label of the training data, a function value of the first loss function corresponding to the at least one second prediction label indicates a difference between the at least one second prediction label and the real label of the training data, and the at least one second weight gradient is obtained through calculation based on the function value of the first loss function corresponding to the at least one second prediction label.

19. The method according to claim 17, wherein that the function value of the target loss function is determined based on the function value of the second loss function corresponding to the first prediction label and a function value of the second loss function corresponding to the at least one second prediction label comprises:
a weight that corresponds to the function value of the second loss function corresponding to the at least one second prediction label and that is in the function value of the target loss function is in a negative correlation with a quantity of update times of the neural network model.

20. The method according to claim 17, wherein the target neural network model comprises a first feature normalization layer located before an output layer of the target neural network model used to perform feature normalization processing on a feature input to the first feature normalization layer.

* * * * *